(12) United States Patent
Winkler et al.

(10) Patent No.: US 11,878,634 B2
(45) Date of Patent: Jan. 23, 2024

(54) FIN GRIP WITH INDEPENDENTLY ADJUSTABLE ARMS

(71) Applicant: Polaris Industries Inc., Medina, MN (US)

(72) Inventors: John M. Winkler, Forest Lake, MN (US); Collin J. Gavic, Forest Lake, MN (US); Ryan J. Andreae, Montrose, MN (US); Michael A. Hritz, Wayzata, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/108,774

(22) Filed: Feb. 13, 2023

(65) Prior Publication Data

US 2023/0192007 A1  Jun. 22, 2023

Related U.S. Application Data

(63) Continuation of application No. 17/402,567, filed on Aug. 15, 2021, now Pat. No. 11,608,011, which is a continuation of application No. 16/736,536, filed on Jan. 7, 2020, now Pat. No. 11,091,103, which is a
(Continued)

(51) Int. Cl.
*B60R 11/06* (2006.01)
*B60P 7/08* (2006.01)
*B60R 11/00* (2006.01)

(52) U.S. Cl.
CPC ............ *B60R 11/06* (2013.01); *B60P 7/0807* (2013.01); *B60R 2011/008* (2013.01); *B60R 2011/0071* (2013.01)

(58) Field of Classification Search
CPC ... B60R 7/14; B60R 11/06; B60R 2011/0071; B60R 2011/008; B60P 7/0807; A47B 1/005
See application file for complete search history.

(56) References Cited

U.S. PATENT DOCUMENTS

| | | |
|---|---|---|
| 1,669,523 A | 5/1928 | Isecoff |
| 1,895,156 A | 1/1933 | Fisher |
| 3,756,096 A | 9/1973 | Bolden |
| (Continued) | | |

FOREIGN PATENT DOCUMENTS

| | | |
|---|---|---|
| CA | 2534230 A1 | 7/2006 |
| DE | 102015006108 A1 | 11/2016 |

*Primary Examiner* — Eret C McNichols
(74) *Attorney, Agent, or Firm* — Harness, Dickey & Pierce, P.L.C.

(57) ABSTRACT

A grip assembly includes a base member, a cross beam coupled to the base member having a first mounting portion and a second mounting portion. A first grip arm is removably coupled to the first mounting portion and is independently positionable into a first position of a first plurality of lockable positions relative to the first mounting portion. A second grip arm is coupled to and is independently positionable into a second position of a second plurality of lockable positions relative to the first grip arm. A third grip arm is removably coupled to the second mounting portion and independently positionable into a third position of a third plurality of lockable positions relative to the second mounting portion. A fourth grip arm is coupled to and is independently positionable into a fourth position of a fourth plurality of lockable positions relative to the third grip arm.

20 Claims, 26 Drawing Sheets

Related U.S. Application Data continuation of application No. 15/974,050, filed on May 8, 2018, now Pat. No. 11,091,102.

(56) References Cited

U.S. PATENT DOCUMENTS

| | | |
|---|---|---|
| 3,792,829 A | 2/1974 | Fickett |
| 4,215,838 A | 8/1980 | Gullota |
| 4,548,392 A | 10/1985 | Rickling |
| 4,823,673 A | 4/1989 | Downing |
| 5,622,341 A | 4/1997 | Stana |
| 5,697,181 A | 12/1997 | Savant |
| 5,898,975 A | 5/1999 | Hancock |
| 5,915,572 A | 6/1999 | Hancock |
| 5,934,112 A | 8/1999 | Rice et al. |
| 6,101,684 A | 8/2000 | Ginocchio |
| 6,164,604 A | 12/2000 | Cirino et al. |
| 6,355,887 B1 | 3/2002 | Gretz |
| 6,484,913 B1 | 11/2002 | Hancock et al. |
| 6,588,637 B2 | 7/2003 | Gates et al. |
| 6,695,183 B2 | 2/2004 | Hancock et al. |
| 6,789,712 B2 | 9/2004 | Gates et al. |
| 6,913,286 B2 | 7/2005 | Kramer |
| 6,929,223 B2 | 8/2005 | Hancock et al. |
| D516,402 S | 3/2006 | Gates et al. |
| D521,366 S | 5/2006 | Polak et al. |
| 7,047,771 B2 | 5/2006 | Tanos |
| 7,100,808 B2 | 9/2006 | Hancock et al. |
| D530,906 S | 10/2006 | Polak et al. |
| D547,643 S | 7/2007 | Ratajczek et al. |
| 7,290,690 B2 | 11/2007 | Hancock |
| 7,337,934 B2 | 3/2008 | Alling et al. |
| D580,748 S | 11/2008 | Polak et al. |
| D608,191 S | 1/2010 | Radle et al. |
| D609,998 S | 2/2010 | Radle et al. |
| D626,494 S | 11/2010 | Gates et al. |
| D626,620 S | 11/2010 | Hicks |
| 7,849,630 B2 | 12/2010 | Carnevali |
| D651,153 S | 12/2011 | Branaman et al. |
| 8,246,095 B2 | 8/2012 | Radle et al. |
| 8,444,034 B2 * | 5/2013 | Bennett ................ B60R 7/14 224/544 |
| 8,534,519 B2 | 9/2013 | Hancock et al. |
| 8,616,505 B2 | 12/2013 | Gates et al. |
| D698,888 S | 2/2014 | Hicks |
| 8,651,289 B2 | 2/2014 | Diaz, Jr. et al. |
| 8,757,399 B2 | 6/2014 | Wolfbauer |
| 8,827,225 B2 | 9/2014 | Andersson |
| D720,111 S | 12/2014 | Nylen |
| 9,182,069 B2 | 11/2015 | Haarburger |
| D748,937 S | 2/2016 | Belitz et al. |
| D749,344 S | 2/2016 | Belitz et al. |
| 9,307,838 B1 | 4/2016 | Blavat |
| 9,458,951 B2 | 10/2016 | Haynes et al. |
| D789,276 S | 6/2017 | Adler |
| 9,851,260 B2 | 12/2017 | Yumoto |
| 9,915,283 B2 | 3/2018 | Chen |
| 10,077,009 B2 * | 9/2018 | Horgen ................ B60R 11/06 |
| 10,260,832 B2 | 4/2019 | Bowe, Jr. et al. |
| 10,473,150 B2 | 11/2019 | Carnevali et al. |
| 10,605,295 B2 | 3/2020 | Nishikawa |
| 10,982,731 B2 | 4/2021 | Hancock et al. |
| D974,992 S * | 1/2023 | Yang ........................ D22/199 |
| 2003/0038150 A1 | 2/2003 | Williams |
| 2003/0042282 A1 | 3/2003 | Gates et al. |
| 2003/0168484 A1 | 9/2003 | Gates et al. |
| 2003/0201634 A1 | 10/2003 | Kramer |
| 2003/0218112 A1 | 11/2003 | Gates et al. |
| 2004/0020954 A1 | 2/2004 | Gates et al. |
| 2004/0113041 A1 | 6/2004 | Hancock et al. |
| 2004/0262462 A1 | 12/2004 | Polak et al. |
| 2005/0092798 A1 | 5/2005 | Borgman et al. |
| 2006/0015167 A1 | 1/2006 | Armstrong et al. |
| 2006/0243678 A1 | 11/2006 | Crowell et al. |
| 2009/0090830 A1 | 4/2009 | Bean et al. |
| 2011/0198375 A1 | 8/2011 | Bennett |
| 2012/0037579 A1 | 2/2012 | Muldoon et al. |
| 2012/0112027 A1 | 5/2012 | Chen |
| 2013/0014420 A1 | 1/2013 | Bastian, Jr. |
| 2015/0115114 A1 | 4/2015 | White |
| 2016/0339849 A1 | 11/2016 | Almhill et al. |
| 2017/0028929 A1 | 2/2017 | Connors |
| 2017/0050577 A1 | 2/2017 | Lindholm et al. |
| 2018/0094892 A1 | 4/2018 | Bowe, Jr. et al. |
| 2020/0139899 A1 | 5/2020 | Winkler et al. |

* cited by examiner

FIN GRIP WITH INDEPENDENTLY ADJUSTABLE ARMS

CROSS-REFERENCE TO RELATED APPLICATIONS

This application is a continuation of U.S. application Ser. No. 17/402,567, filed Aug. 15, 2021, which is a continuation of U.S. application Ser. No. 16/736,536, filed Jan. 7, 2020 (now U.S. Pat. No. 11,091,103), which is a continuation of U.S. application Ser. No. 15/974,050, filed on May 8, 2018 (now U.S. Pat. No. 11,091,102). The above-mentioned patent applications are incorporated herein by reference in its entirety.

FIELD

The present disclosure relates to grip for holding implements carried by a vehicle, more particularly, to a grip with independently adjustable arms.

BACKGROUND

This section provides background information related to the present disclosure which is not necessarily prior art.

Vehicles such as cars, trucks and all-terrain vehicles are used for hauling various implements such as tools, utensils and other equipment. Grips have been used to hold implements while the vehicle is moving. This prevents the implements from shifting and reduces the amount of distraction to the vehicle operator.

Flexibility for mounting positions as well as the ability to accommodate various sized articles improves the utility of the grip. Many different types of grips are limited in the amount of ways that they may be used.

SUMMARY

This section provides a general summary of the disclosures, and is not a comprehensive disclosure of its full scope or all of its features.

The present disclosure provides a gripping device that allows flexibility in the types of implements and the position of the implement relative to the grip.

In one aspect of the disclosure, a grip assembly comprises a base member, an intermediate member and a first grip arm removably coupled to and independently positionable relative to the intermediate member. A second grip arm is also removably coupled to and independently positionable relative to the intermediate member.

Further areas of applicability will become apparent from the description provided herein. The description and specific examples in this summary are intended for purposes of illustration only and are not intended to limit the scope of the present disclosure.

In another aspect of the disclosure, a grip assembly includes a first grip arm, a base member integrally formed with the first grip arm, a second grip arm movably coupled to and independently positionable relative to the first grip arm and a fastener securing the second grip arm relative to the first grip arm.

In yet another aspect of the disclosure, a grip assembly includes a first grip arm having a first plurality of inner teeth thereon. The first plurality of inner teeth disposed around a first fastener opening. A base member is integrally formed with the first grip arm. A second grip arm is movably coupled to and independently positionable relative to the first grip ar. The second grip arm comprises a second plurality of inner teeth engaging the first plurality of inner teeth. The second plurality of inner teeth are disposed around a second fastener opening. A fastener is disposed within the first fastener opening and a second fastener opening and secures the second grip arm relative to the first grip arm by engaging the first plurality of inner teeth and the second plurality of inner teeth.

In another aspect of the disclosure, a method of positioning a grip assembly includes disposing a second grip arm relative to a first grip arm, engaging a first plurality of inner teeth of the first grip arm to a second plurality of inner teeth on a second grip arm and movably coupling a second grip arm to the first grip arm using a fastener.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
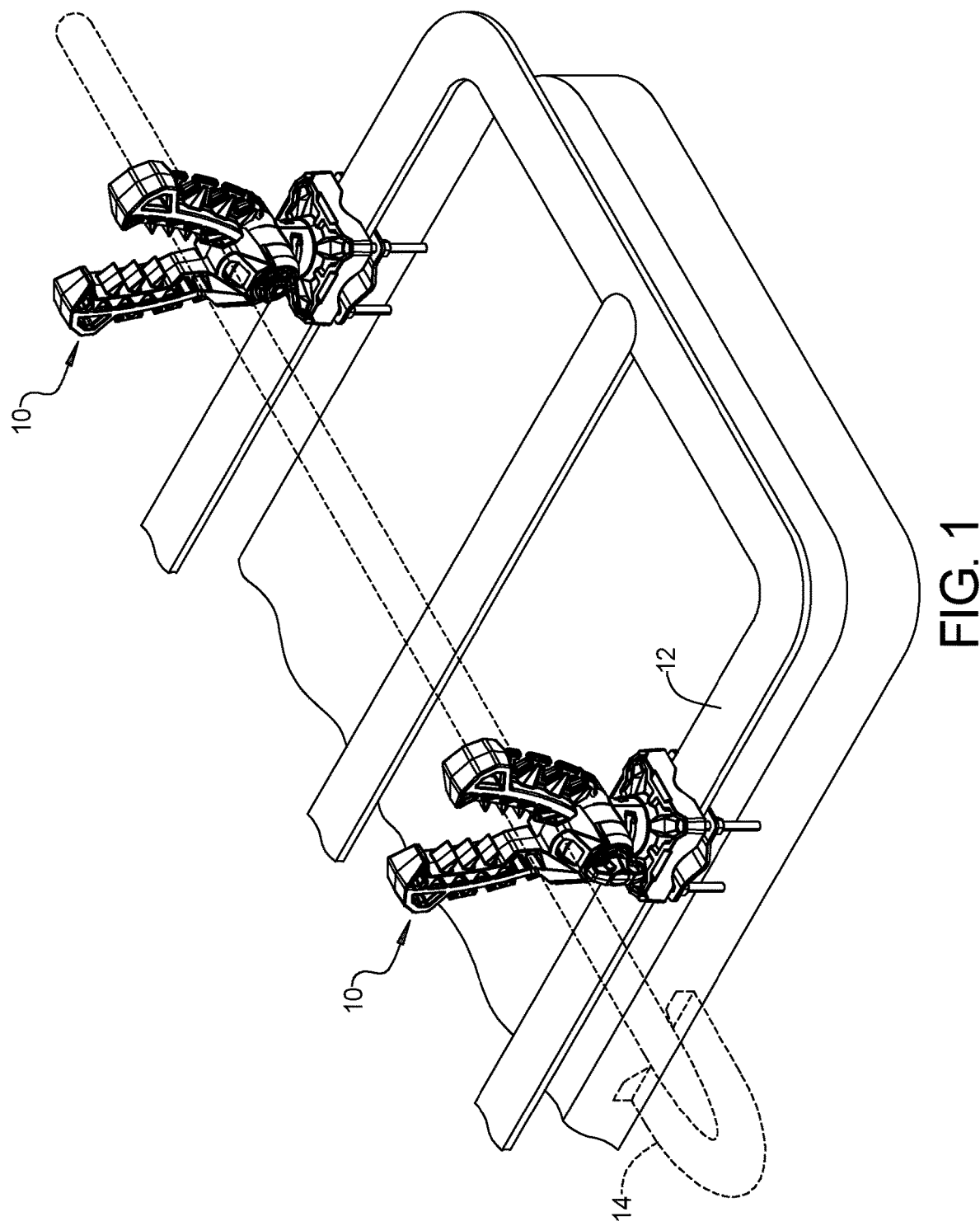
FIG. 1 is a perspective view of gripping devices in accordance with one aspect of the present disclosure attached to a rack of a vehicle.
Figure 2:
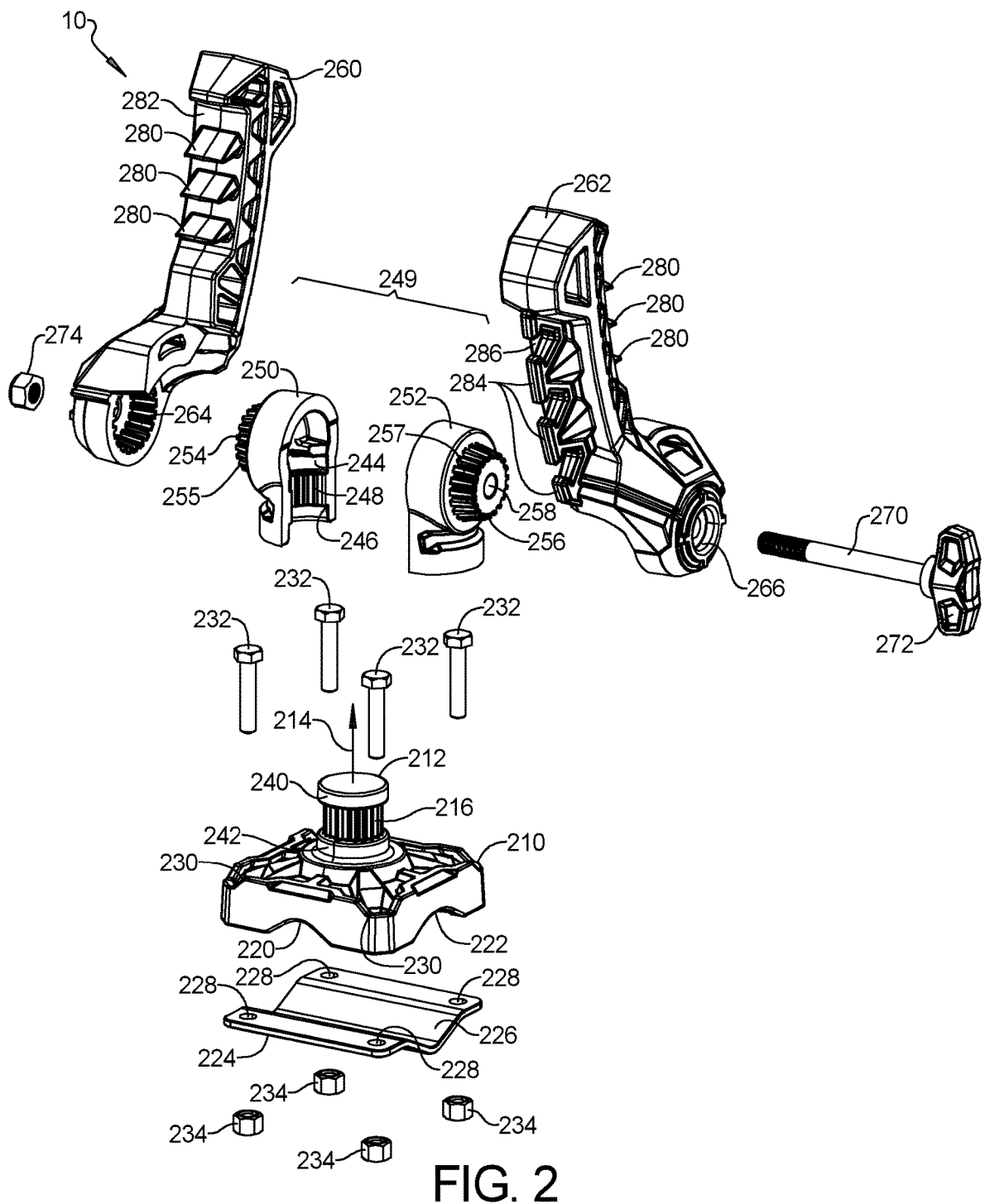
FIG. 2 is an exploded view of the one of gripping devices of FIG. 1.
Figure 3A:
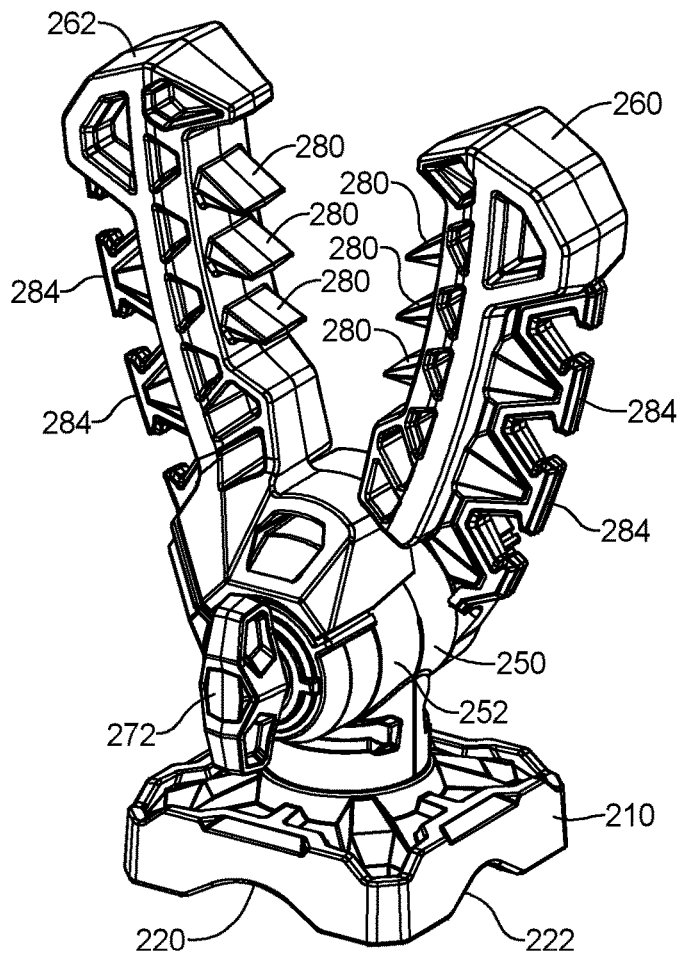
FIG. 3A is a perspective view of the gripping device of FIG. 1.
Figure 3B:
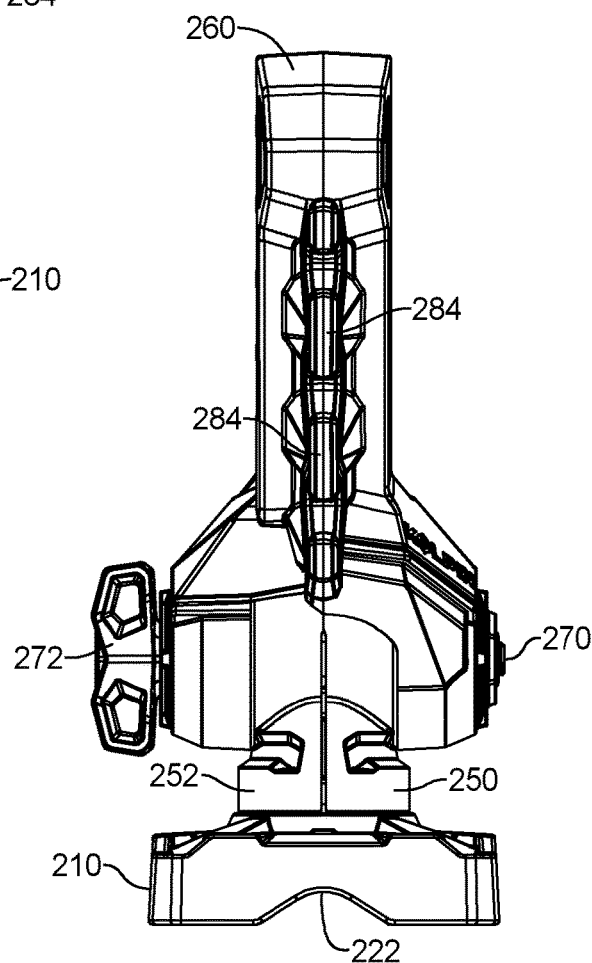
FIG. 3B is a first side view of the gripping device of FIG. 1.
Figure 3C:
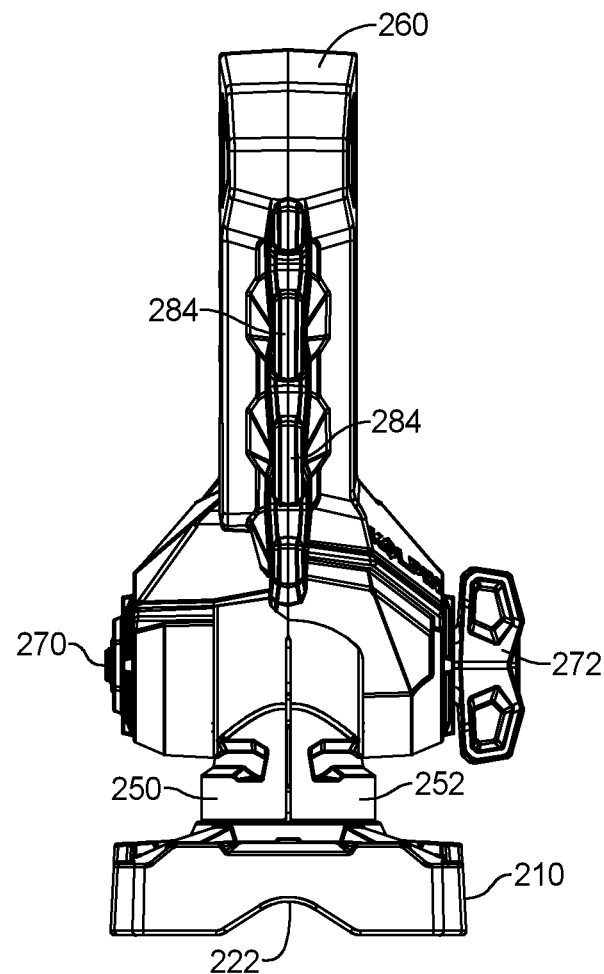
FIG. 3C is a second side view of the gripping device of FIG. 1.
Figure 3D:
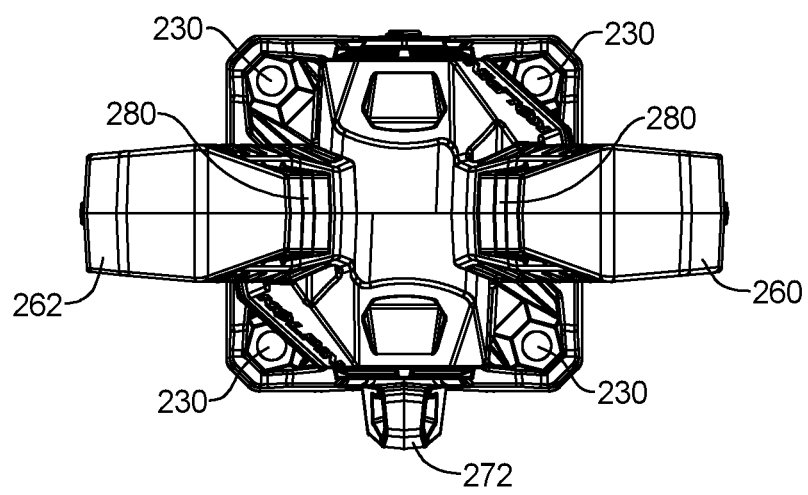
FIG. 3D is a top view of the gripping device of FIG. 1.
Figure 3E:
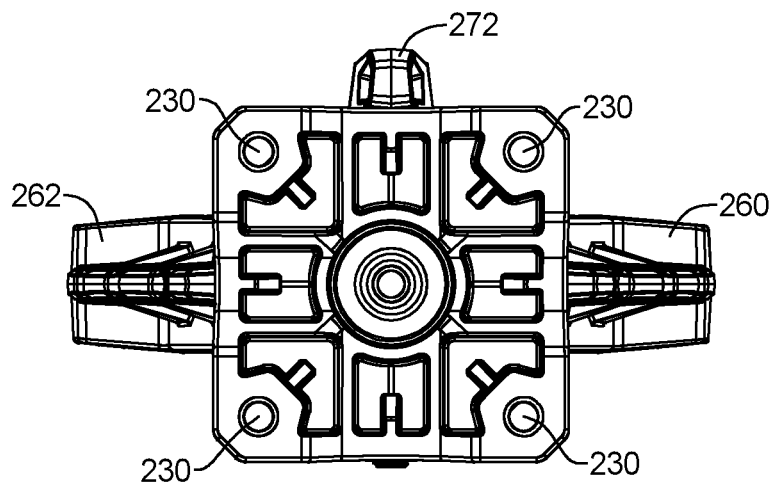
FIG. 3E is a bottom view of the gripping device of FIG. 1.
Figure 3F:
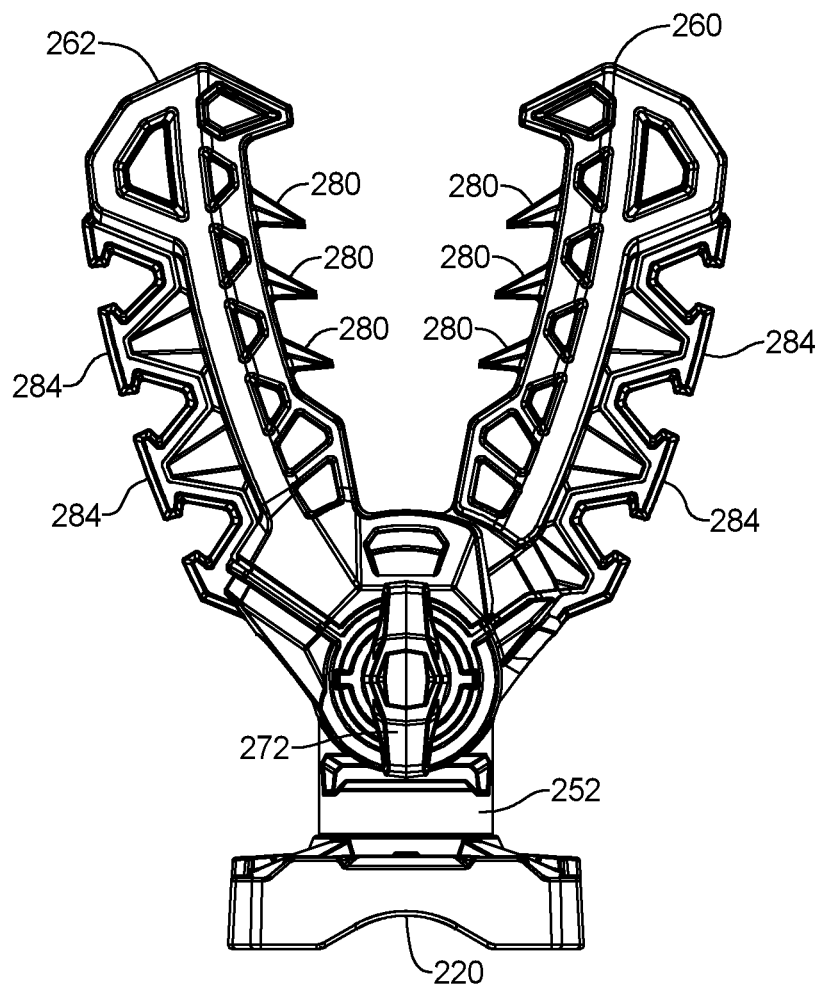
FIG. 3F is a front view of the gripping device of FIG. 1.
Figure 3G:
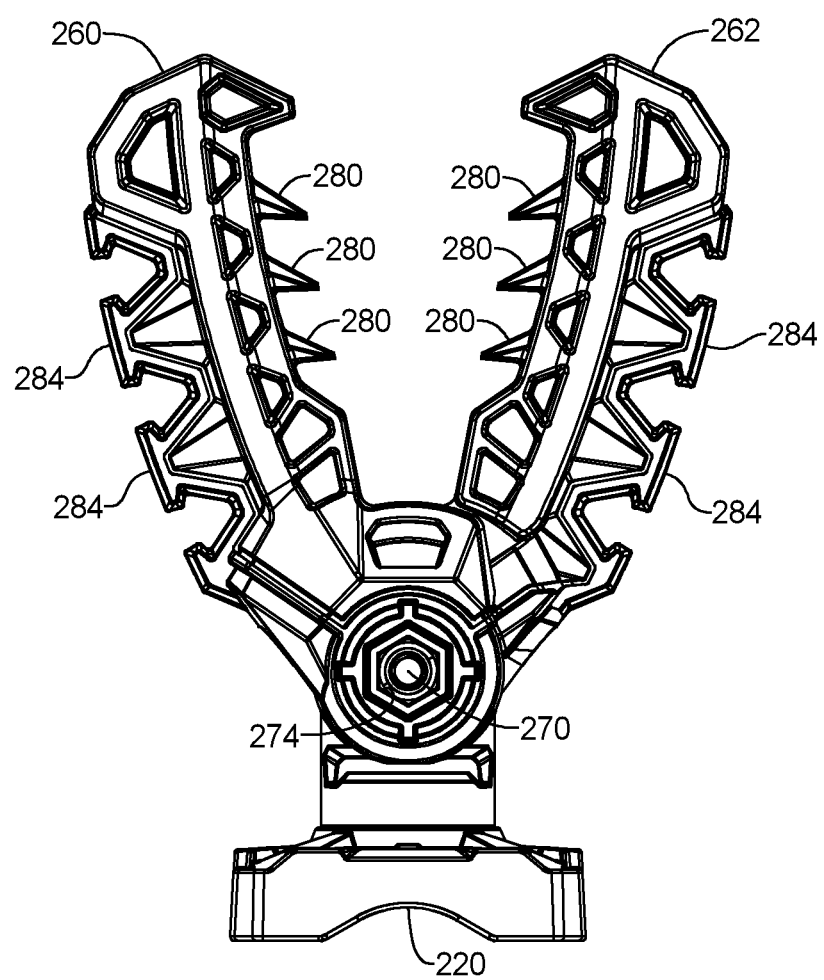
FIG. 3G is a back view of the gripping device of FIG. 1.
Figure 4A:
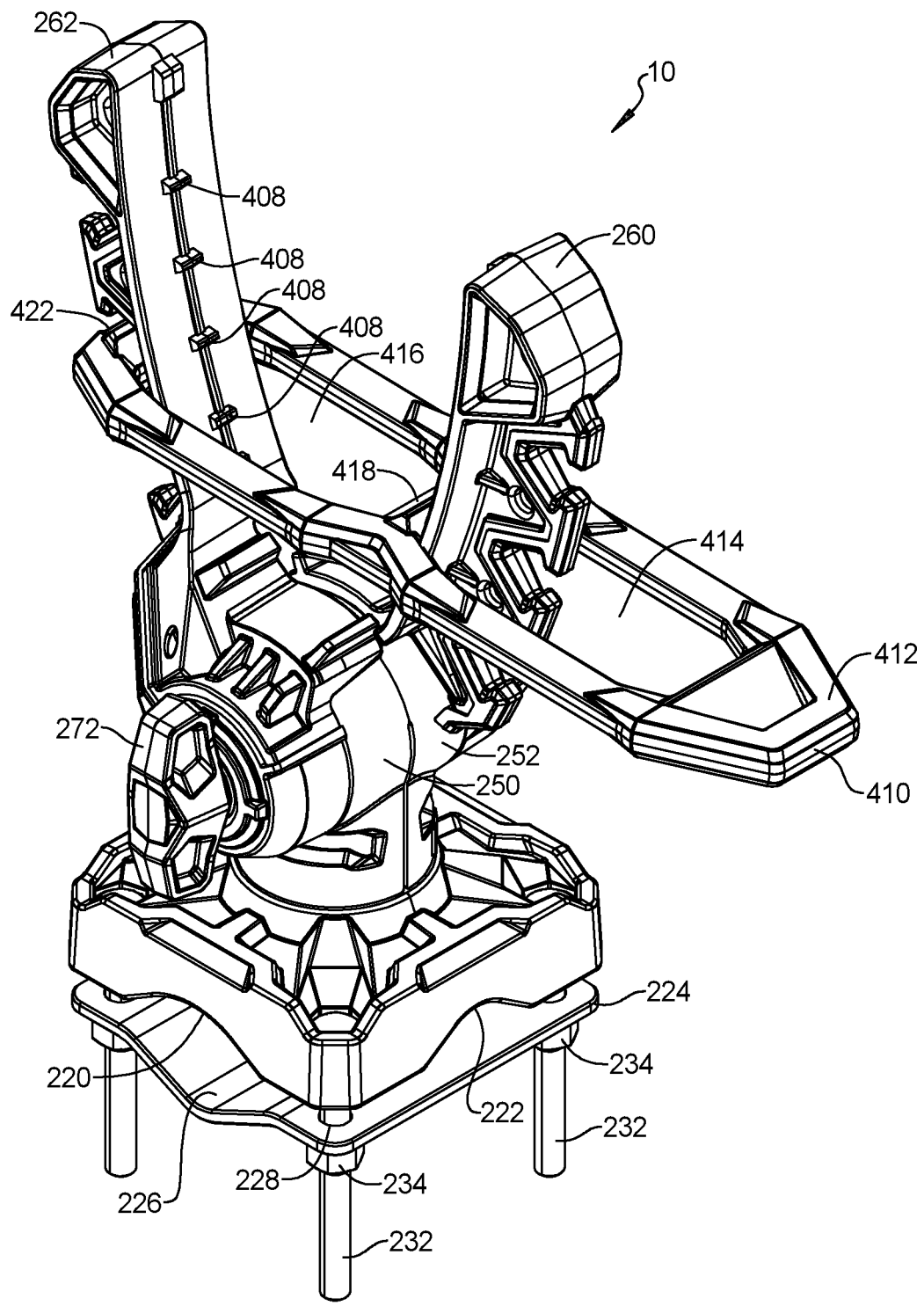
FIG. 4A is a perspective view of the gripping device of FIG. 1 with the retainer and backer plate attached thereto.
Figure 4B:
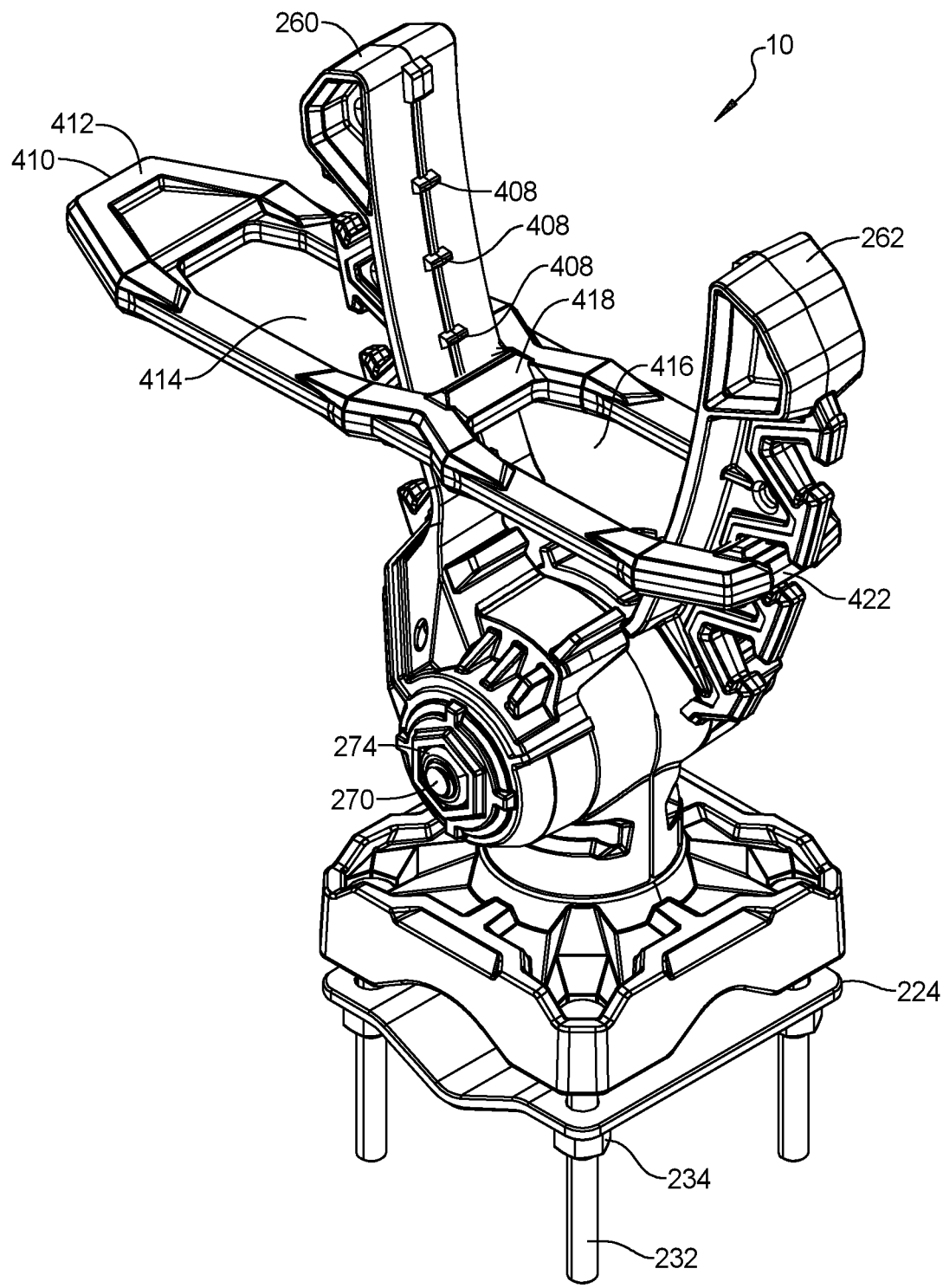
FIG. 4B is a perspective view of the back view of the gripping device of FIG. 4A.
Figure 4C:
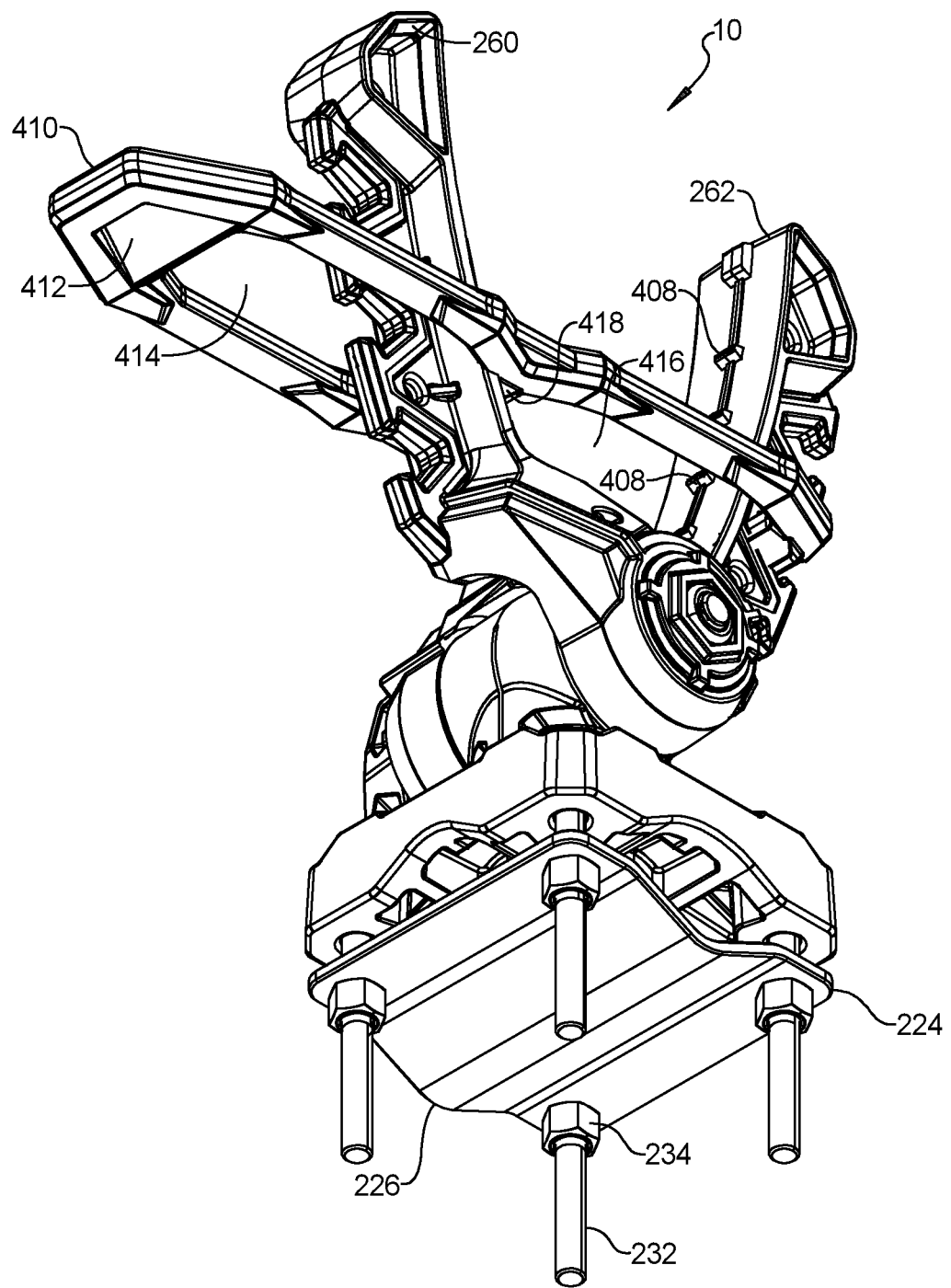
FIG. 4C is a perspective bottom view of the gripping device of FIG. 4A.
Figure 4D:
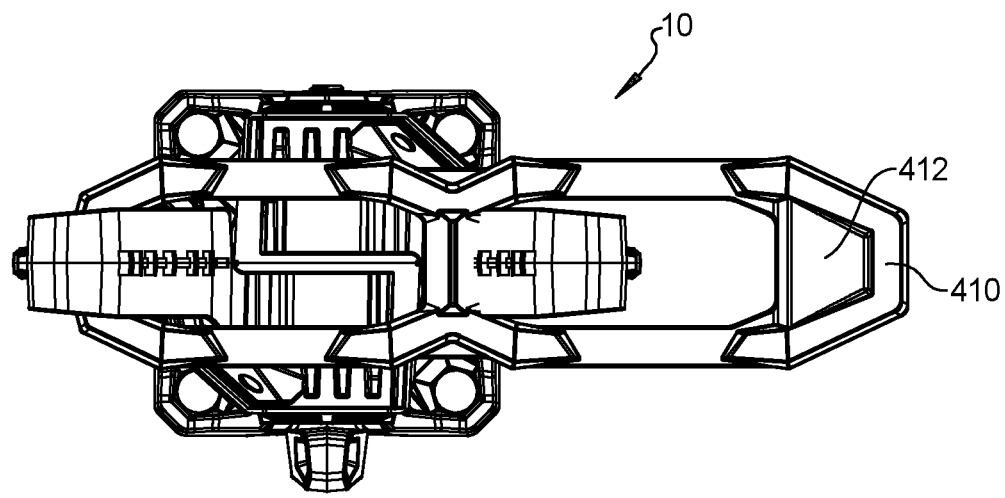
FIG. 4D is a top view of the gripping device of FIG. 4A.
Figure 4E:
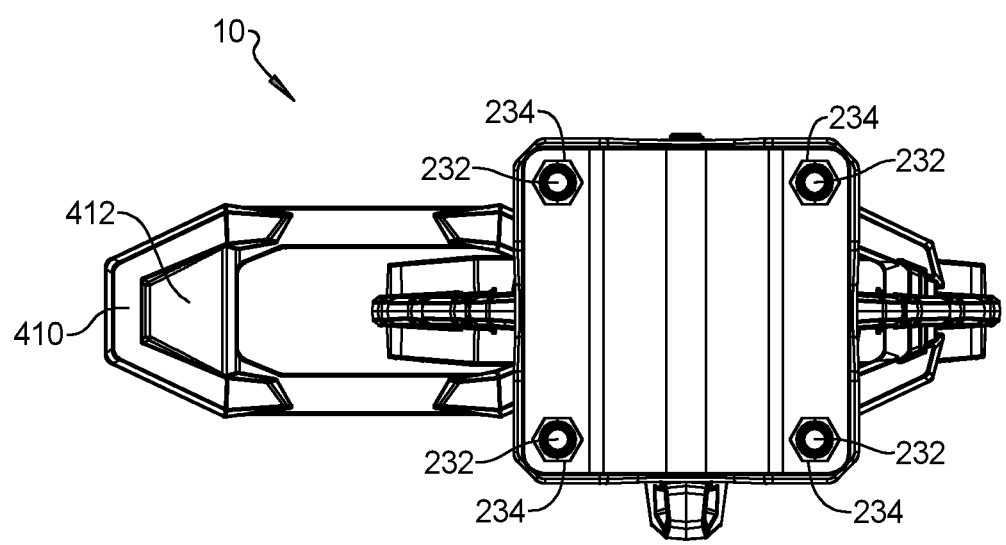
FIG. 4E is a bottom view of the gripping device of FIG. 4A.
Figure 4F:
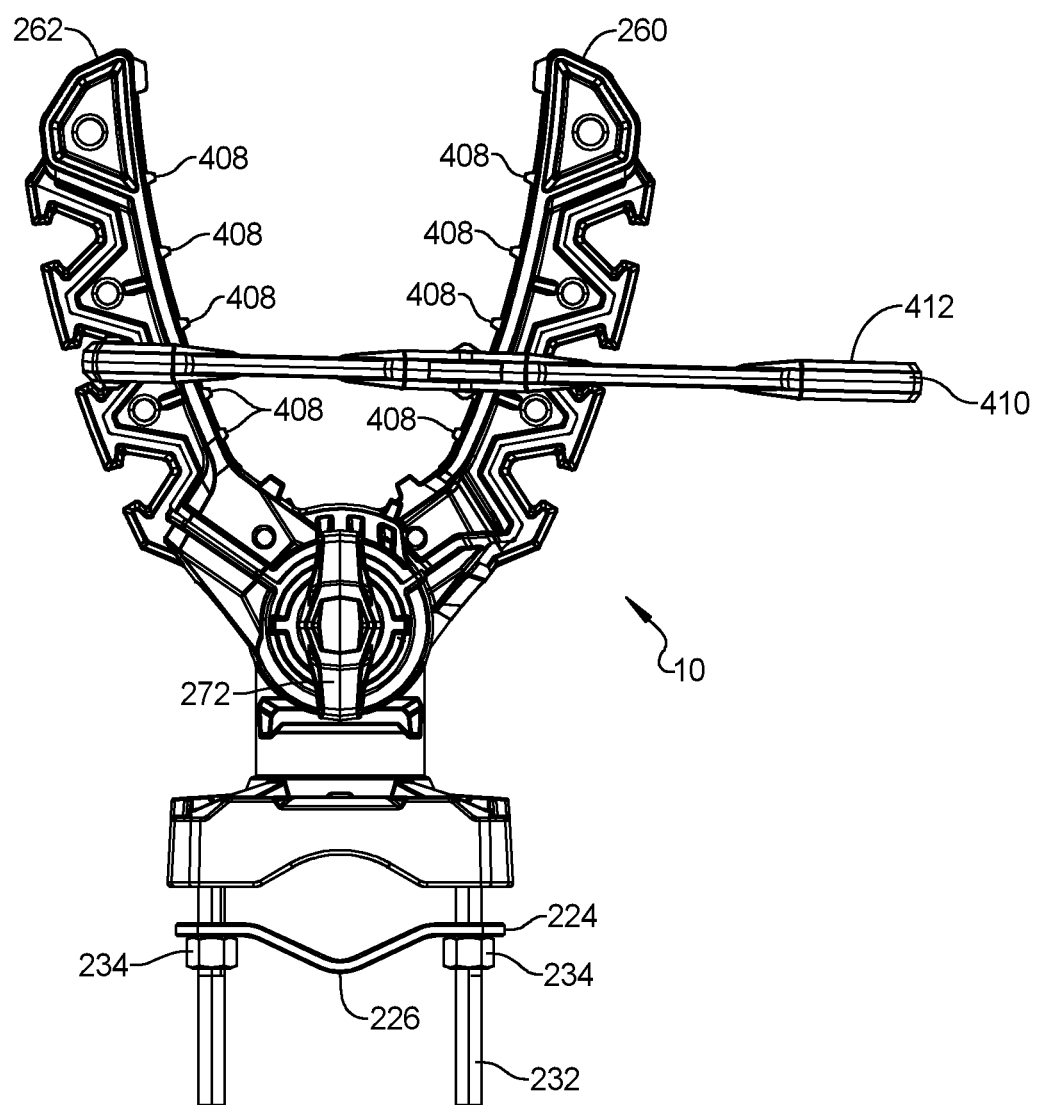
FIG. 4F is a front view of the gripping device of FIG. 4A.
Figure 4G:
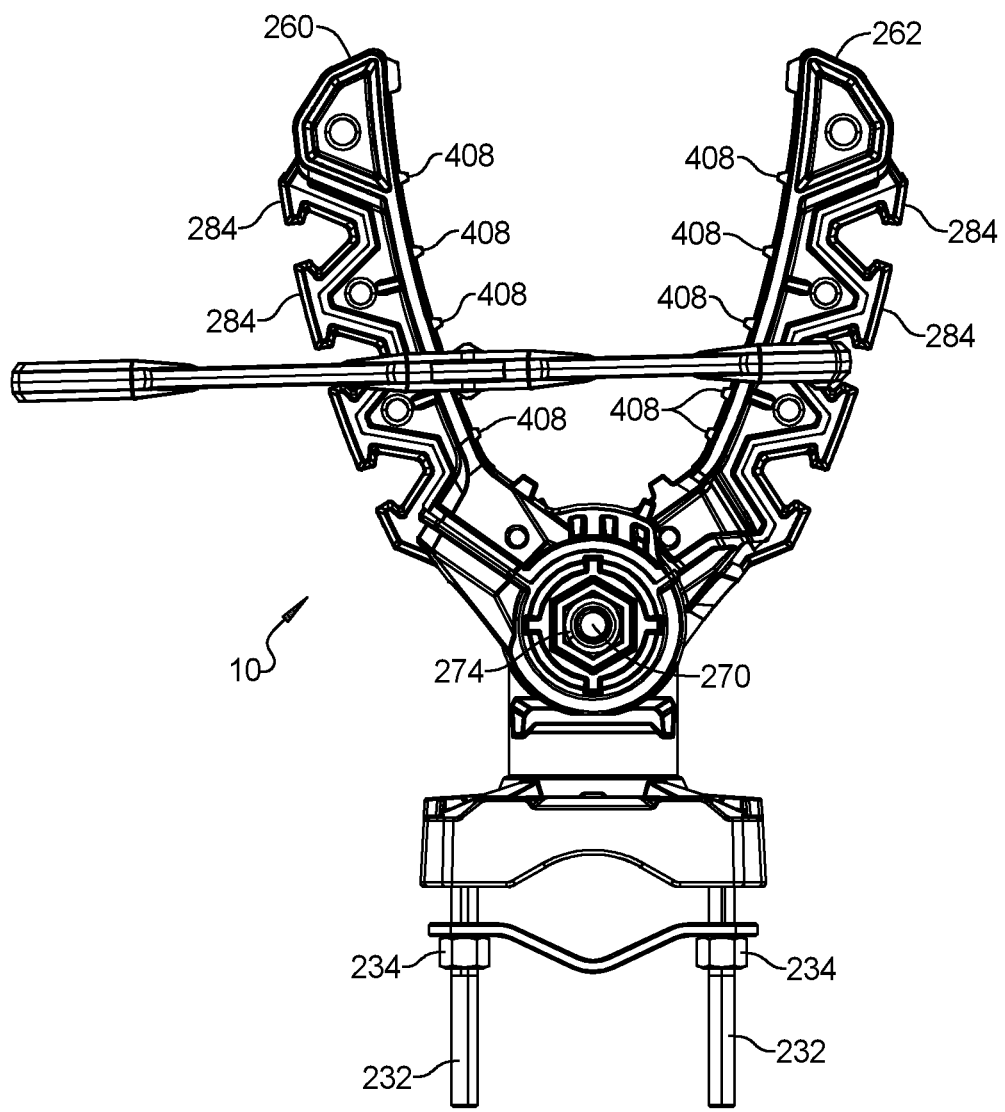
FIG. 4G is a back view of the gripping device of FIG. 4A.
Figure 4H:
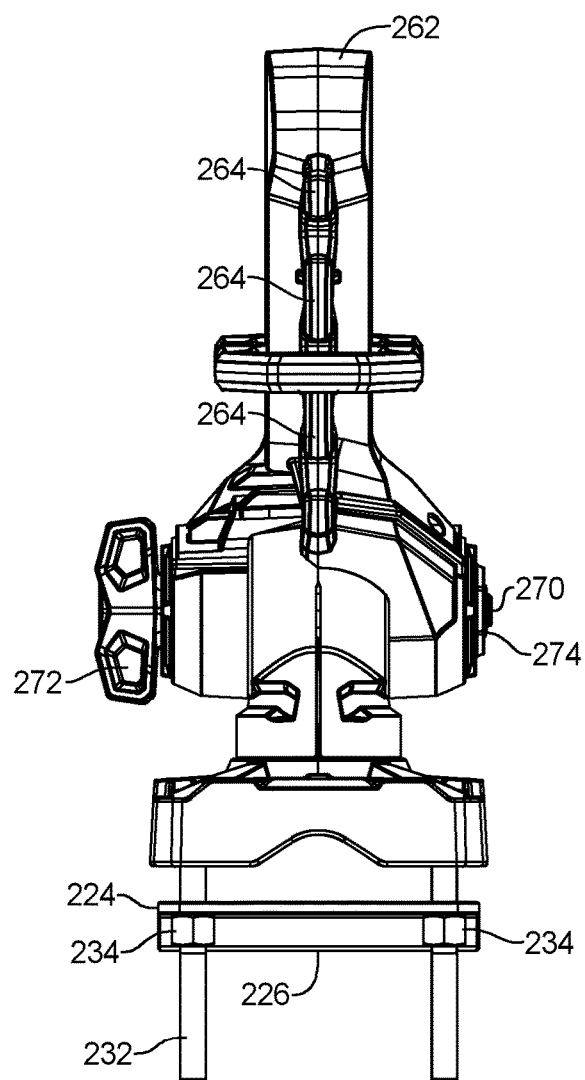
FIG. 4H is the right side of the gripping device of FIG. 4A.
Figure 4I:
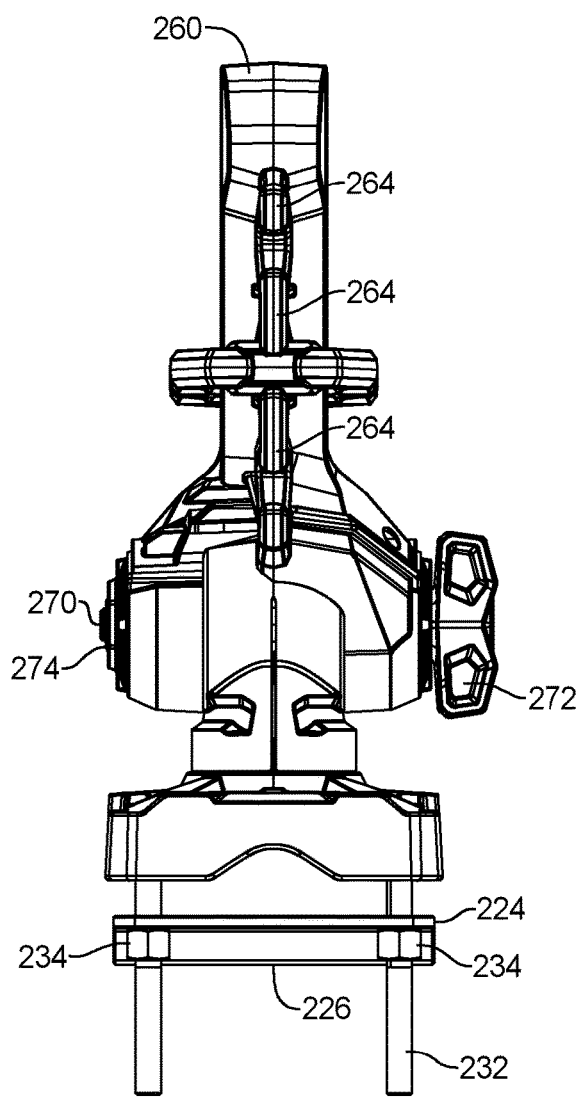
FIG. 4I is the left side view of the gripping device of FIG. 4A.

Referring now to FIG. 1, a pair of grips 10 are secured to a portion of a vehicle 12. The portion of the vehicle 12 may include but is not limited to a rack, roll cage, frame, body panel, body structure or the like. The grips 10 are shown holding an implement such as a shovel 14. As will be further described below, the grip 10 may be mounted in various positions of the vehicle 12 and may have independently movable arms and connections for securing the implement 14 according to the examples set forth below.

Referring now to FIG. 2 and FIGS. 3A-3G, an exploded view as well as different elevational views of one of the grips 10 are illustrated. The grips 10 include a mounting base 210 that has an extension 212 extending in a longitudinal direction as indicated by the arrow 214. The extension 212 includes a plurality of teeth 216 extending therearound. The teeth 216 extend in a longitudinal direction as illustrated in this example.

The mounting base 210 may also include receiving portions 220 and 222. The receiving portions 220, 222 may extend laterally across the mounting base 210. The receiving portions 220, 222 may be used for receiving a structure of the vehicle such as a rack or handlebar.

A backer plate 224 also has a receiving portion 226. The receiving portion 226 receives the opposite surface of the vehicle structure to which the mounting base 210 is mounted. The backer plate 224 includes openings 228 which correspond to openings 230 through the mounting base 210. The openings 228, 230 receive fasteners such as a bolt 232 which is secured to a nut 234 that is positioned adjacent to the backer plate 224. The nuts 234 may, for example, be locknuts.

The extension 212 may include a first flange 240 and a second flange 242. The flanges 240, 242 as well as the teeth 216 are used to engage recesses 244, 246 and 248 within an intermediate member 249. That is, the intermediate member 249 has two portions 250, 252 that enclose extension 212. The two portions 250, 252 may completely surround the extension 212 and may be prevented from rotating by the engagement of the recesses 248 with the teeth 216. Thus, the two portions 250, 252 of intermediate member 249 may be affixed in multiple annular positions about the longitudinal axis 214.

Externally, the two portions 250, 252 of intermediate member 249 may each include tooth portions 254, 256, respectively, that include conical shaped teeth 255, 257, respectively. That is, the teeth 255, 257 have a conical cross section. A channel 258 (only one of which is shown) may extend through the tooth portion 254, 256.

Grip arms 260, 262 are fastenably coupled to the tooth portions 254, 256 of the intermediate member 249. In particular, the grip arms 260, 262 may include respective receiving portions 264, 266 for receiving the respective tooth portions 254, 256. A fastener 270 including a head end 272 and a nut 274 are received through the receiving portions 264, 266, the channel 258 and the portions 250, 252. The position of each grip arm 260, 262 is independently positionable relative to the other respective grip arms 260, 262 and the portions 250, 252, subject to the position of the engagement of the teeth. The grips 260, 262 are also removable from the portions 250, 252 for positioning in the desired position.

The grip arms may include a plurality of fins 280 that may help in securing an implement therebetween. Each grip arm 260, 262 may include a plurality of fins 280. The fins 280 may be positioned within an inner surface 282 of the grip arms 260, 262.

A plurality of projections 284 may be positioned on an outer surface 286 of the grip arms 260, 262.

The grip arms 260, 262 may be formed from metal or a composite material. The structure such as the fins 280 and the projections 284 may be overmolded with a rubber or a plastic material.

In operation, to independently adjust the position of the grip arms 260, 262 relative to the intermediate members 250, 252, the nut 274 of the fastener 270 is loosened. The grip arms 260, 262 may be removed or partially removed from the engagement of the toothed portions 254, 256 in an axial direction defined by the axis of the fastener 270. The grip arms 260, 262 are angularly positioned and placed onto the toothed portions 254, 256.

Referring now to FIGS. 4A-4I, an assembled version of the grip 10 is illustrated. In this example, the arms 260, 262 have not been overmolded to show the rigid structure beneath. The fins 280 and projections 284 are not shown. Rather, nubs 408 are positioned where the fins 280 of FIG. 3 are formed. The grip 10 may be used for holding an implement as described above. To more fully secure the implement within the grip 10, a retaining strap 410 may be used. The retaining strap 410 may have a grip portion 412, a first opening 414 and a second opening 416 defined by a cross member 418. An end member 422 engages the protrusions 284 on the arm 260.

The fasteners 232 are shown coupled to the nuts 234 and to the plate 224. In one example, the backer plate 224 and the mounting base 210 may be square so that the receiving portion 226 may be oriented in either direction to align with the receiving portions 220 or 222.

Figure 5:
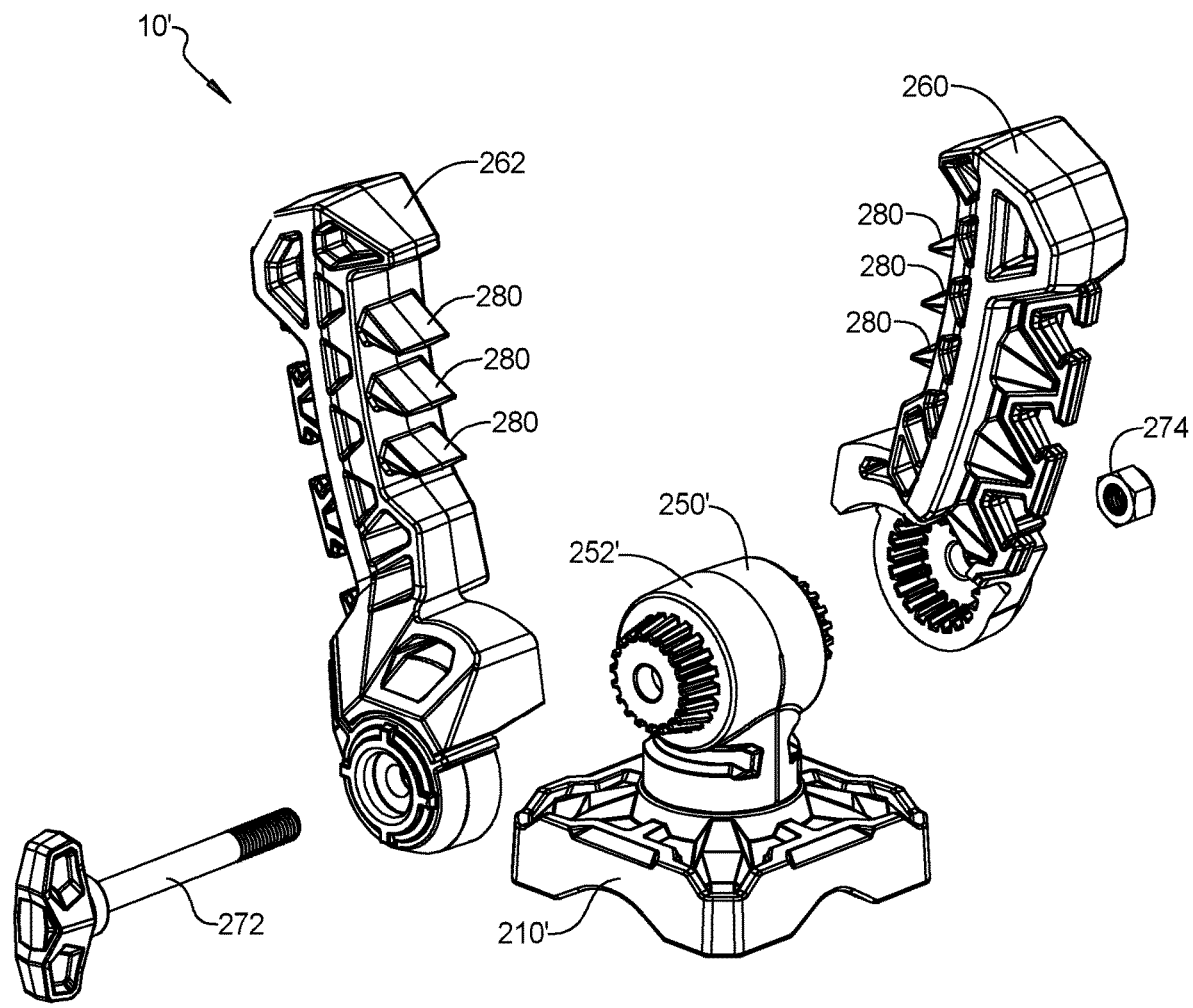
FIG. 5 is a perspective view of the gripping device having a fixed base and intermediate member.

Referring now to FIG. 5, an alternative example of a grip 10' is set forth. In this example, the intermediate member 250 and 252 of FIGS. 1-4 have been replaced by intermediate members 250' and 252' which are integrally formed with the base 210'. In this example, the intermediate members and the base 210' may be fixed in position during the molding process. The overall outer shape of the portions 250', 252' and 210' may be identical to those set forth above in FIGS. 2, 3 and 4.

Figure 6A:
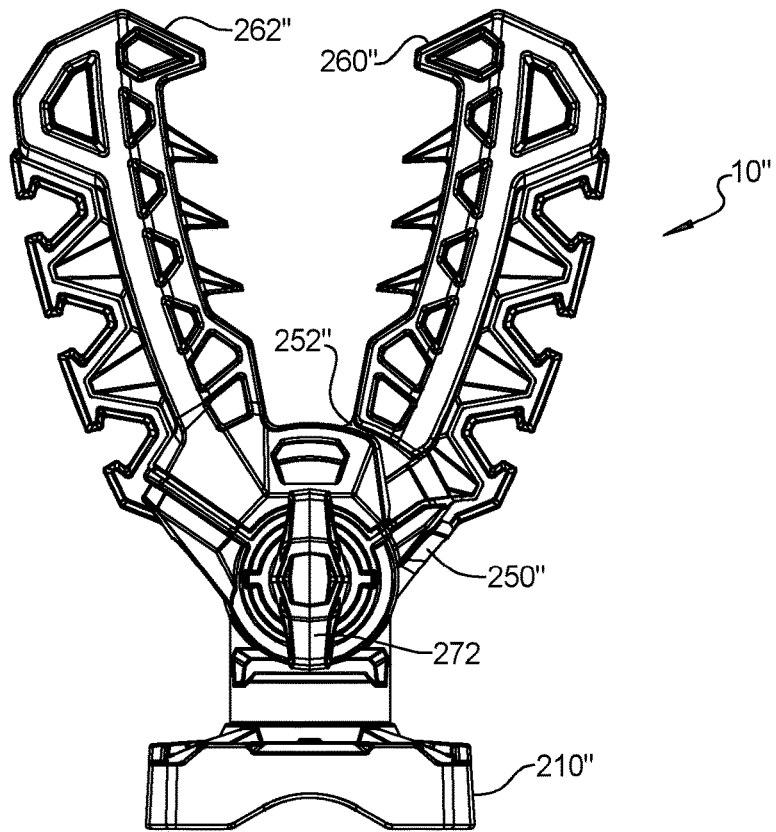
FIGS. 6A-6C are front and exploded views of an example of a gripping device having one fixed arm.
Figure 6B:
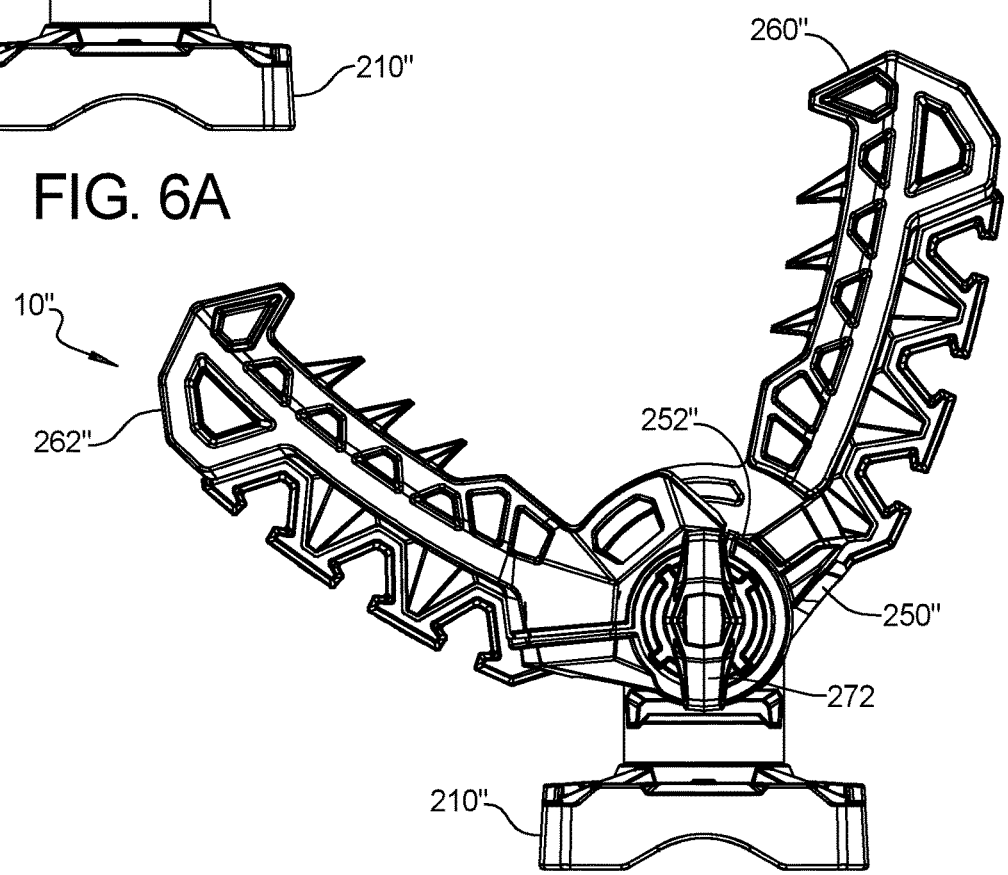
Figure 6C:
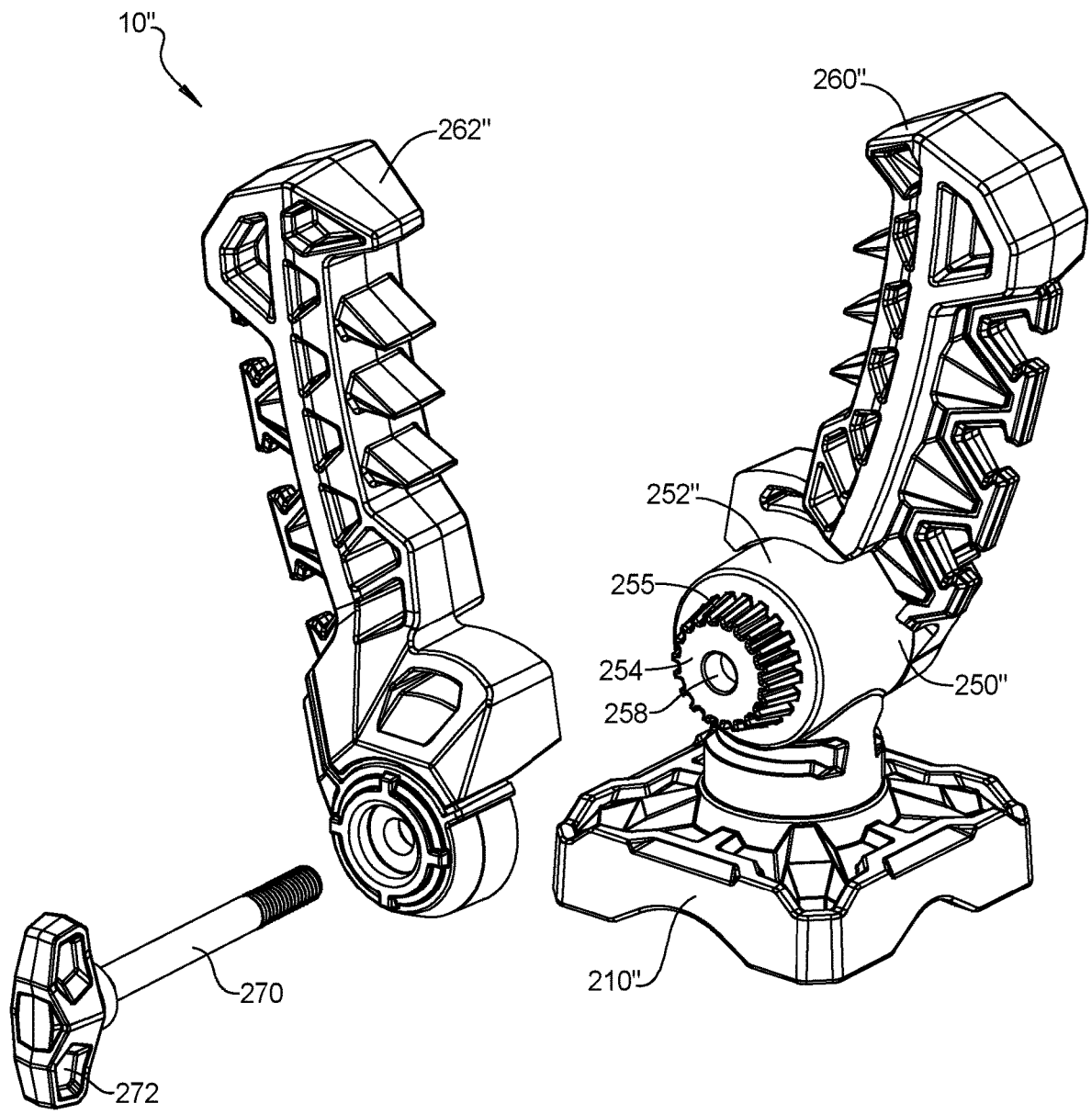

Referring now to FIGS. 6A-6C, the arm 260" may be integrally formed with the intermediate member 250". The base 210" may also be integrally formed with the intermediate member 250" and the arm 260". Although, base 210" may be separate. In this example, the arm 260" is fixed relative to the intermediate member 250" and the base 210". The arm 262" moves relative to the intermediate member 252" and engages teeth 255 of the tooth portion 254. Further, the intermediate member 252" may also be integrally formed with the intermediate member 250" and the base 210". The intermediate member 250" may rotatably fixed relative to the base 210". That is, the intermediate member may be positioned at different positions around the longitudinal axis of the grip. The intermediate member 250" with the arm 262" and intermediate member 252" may be two separate pieces, in a similar manner to FIG. 2 except with the integral arm.

As can be seen by contrasting FIGS. 6A and 6B, the arm 262" may be fastened in various positions relative to the base and to the arm 260".

Figure 7:
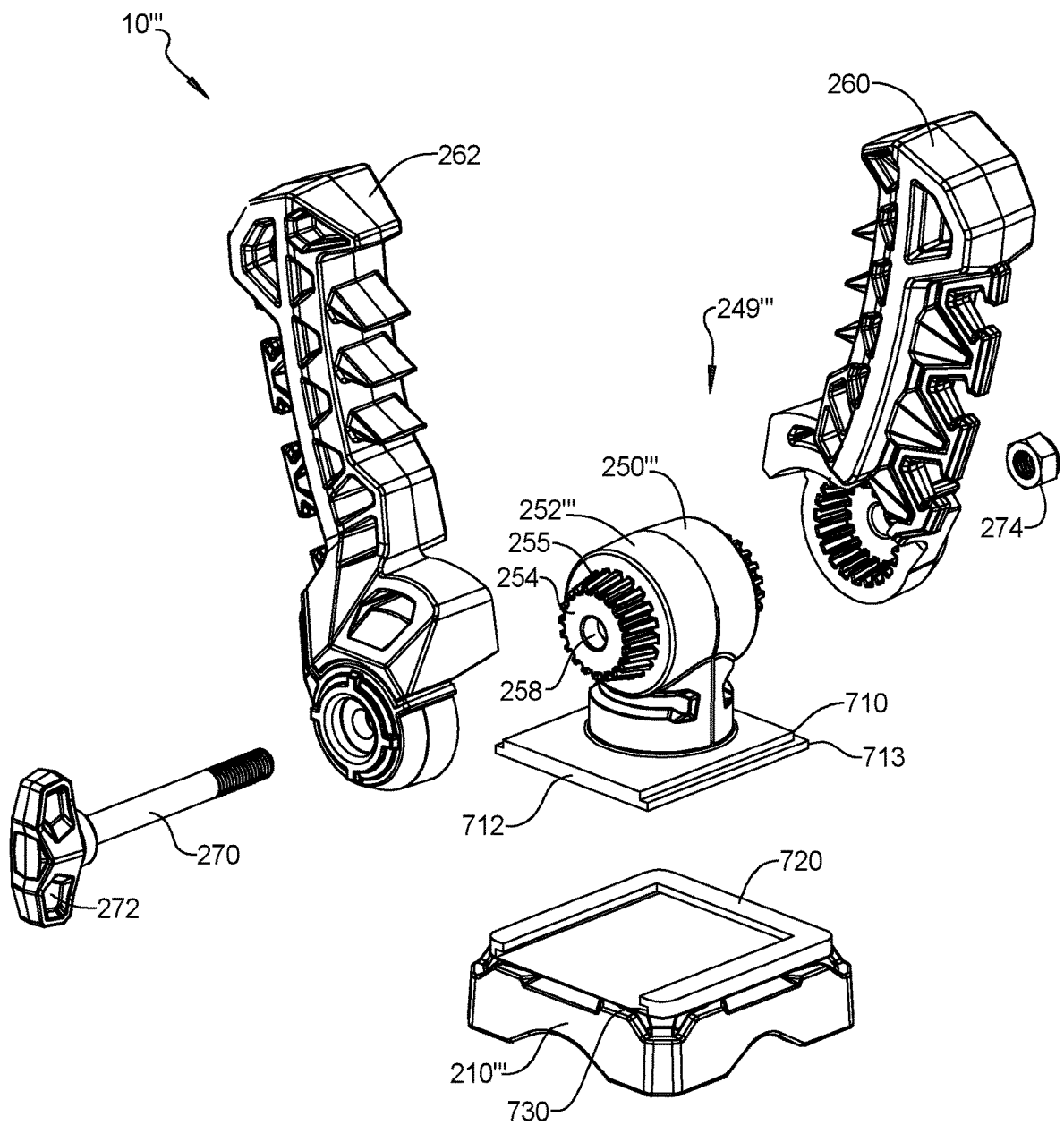
FIG. 7 is an exploded perspective view of a gripping device having a slide-on intermediate member.

Referring now to FIG. 7, another example of a grip $10'''$ is set forth. In this example, the portions $250'''$ and $252'''$ of the intermediate member $249'''$ are integrally formed and have a rectangular base $210'''$. The base $210'''$ has an edge 710 and a thickness 712. The base $210'''$ has longitudinally extending walls 720 disposed around three sides of the base $210'''$. The walls 720 thus form a "U" shape. The walls 720 include a channel 730 that is used for engaging or receiving the edge 710, which has a reduced thickness 713 from the base $210'''$. The height of the channel 730 accommodates the thickness 712 of the edge 710.

Figure 8:
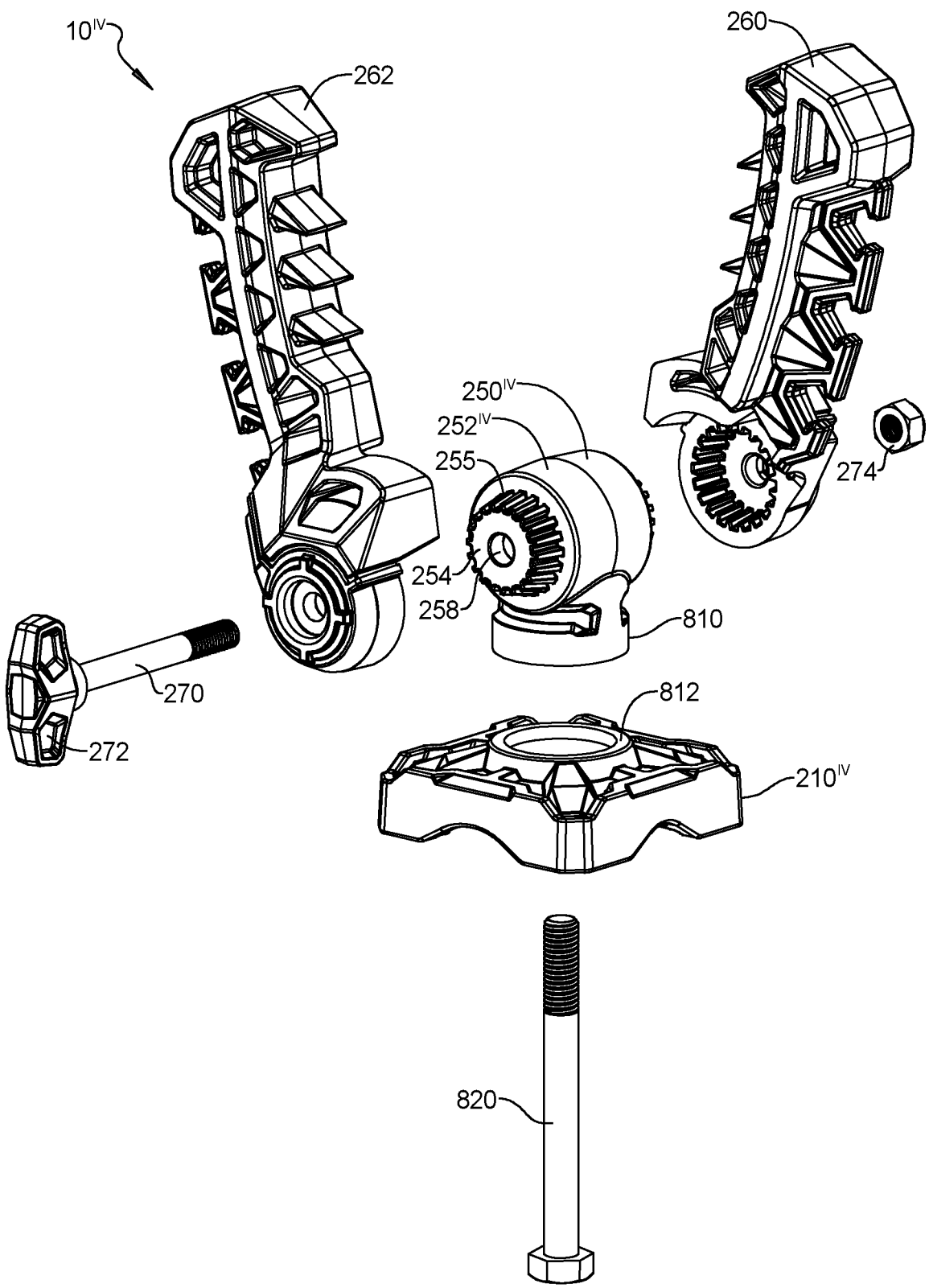
FIG. 8 is an exploded perspective view of the gripping device having an intermediate member fastened from beneath.

Referring now to FIG. 8, another example of a grip $10^{iv}$ is illustrated. In this example, the intermediate member $249^{iv}$ formed by portions $250^{iv}$ and $252^{iv}$ may be integrally formed. A base 810 of the intermediate member $249^{iv}$ may be received within the walls 812 extending in a longitudinal direction from the base $210^{iv}$. A bolt 820 may secure the portions $250^{iv}$, $252^{iv}$ and intermediate member $249^{iv}$ to the base $210^{iv}$. The fastener 820 may correspond or be coincident with the vertical axis of the base $210^{iv}$.

Figure 9:
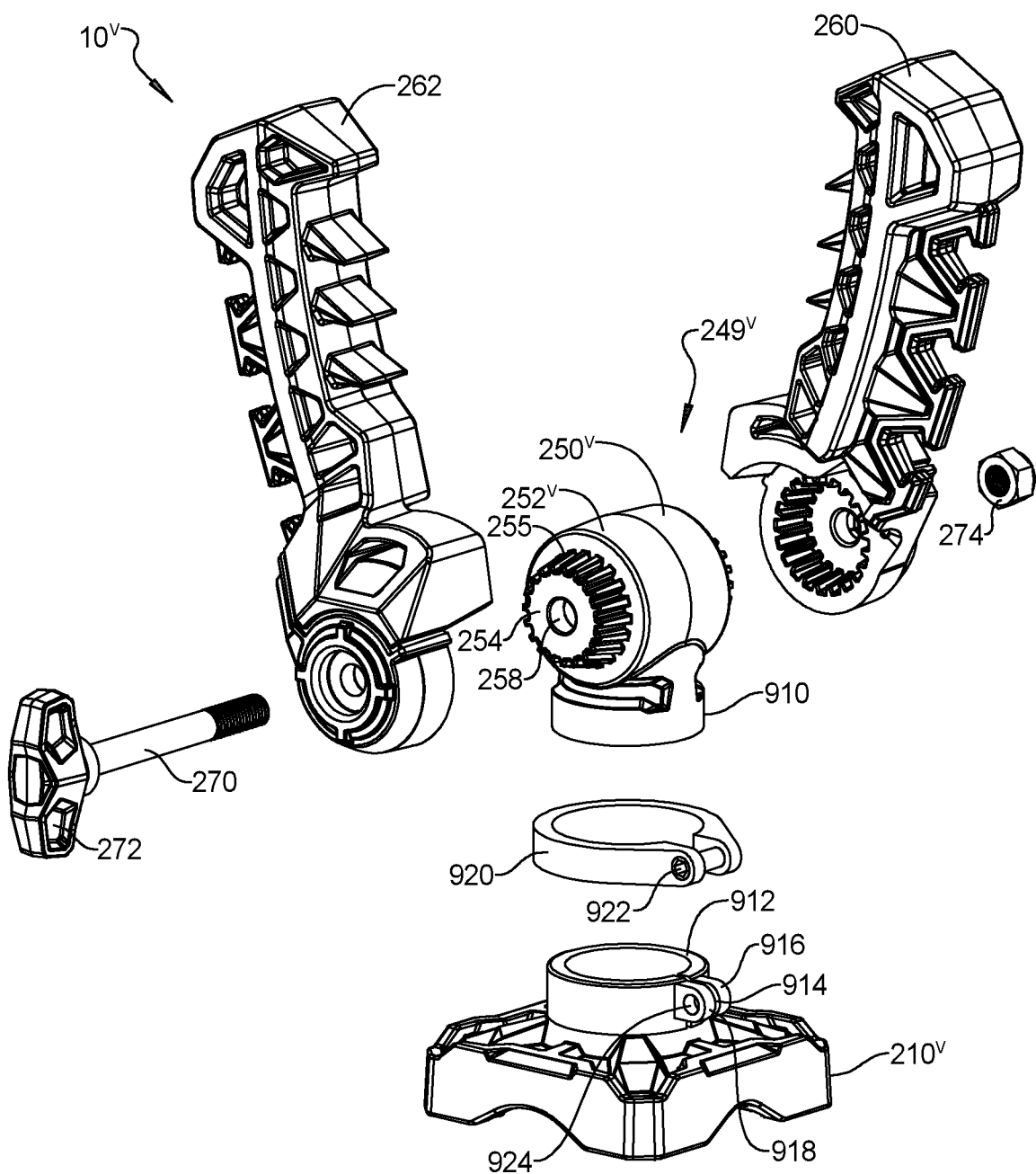
FIG. 9 is a perspective view of another example of a gripping device having a clamp collar for securing the intermediate member.

Referring now to FIG. 9, another example of a grip $10^v$ is set forth. In this example, the intermediate member 249 may be formed by two portions $250^v$ and $252^v$ that are integrally formed. The two portions $250^v$ and $252^v$ may include a flange 910 that is received within longitudinally extending walls 912. The longitudinally extending walls 912 may have an opening 914 between two wall extension 916 and 918. The wall extensions 916 and 918 extend outward from the wall 912. A clamp collar 920 may be coupled to the base $210^v$ using a fastener 922. The fastener 922 may be received within the channel 924 of the walls 916, 918. Through the action of the fastener 922, the walls 916, 918 may be squeezed together and thus the opening 916 is reduced so that the portions 250", $252^v$ are secured therein.

Figure 10:
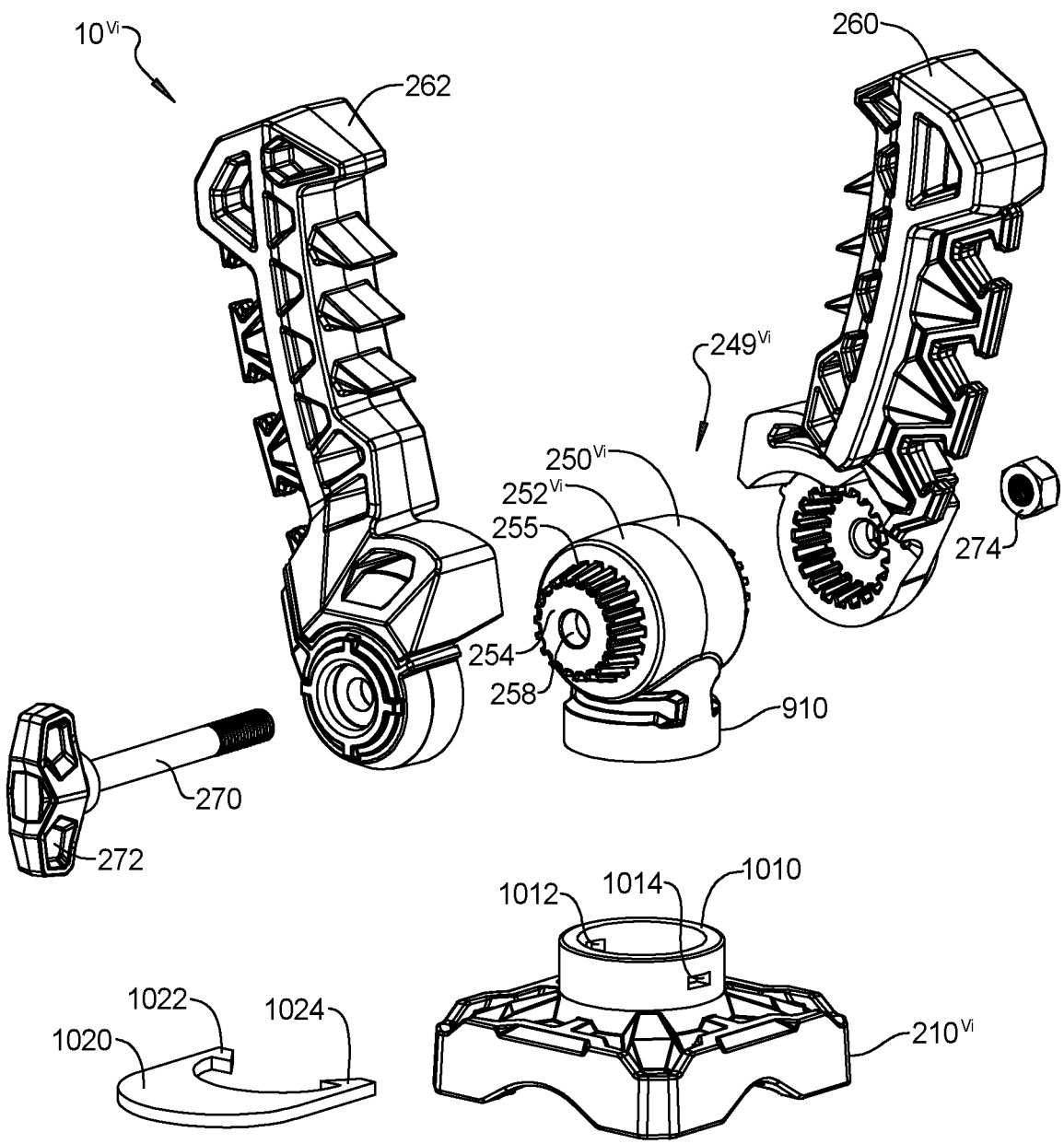
FIG. 10 is an exploded view of another example of a gripping device having an intermediate member secured to the base using a clip.

Referring now to FIG. 10, another example of a grip $10^{iv}$ is set forth. In this example, the intermediate member $249^{iv}$ may be formed in the same manner set forth in FIG. 9 and thus will not be described further. In this example, longitudinally extending walls 1010 from the base $210^{iv}$ are set forth. The longitudinally extending walls may be uninterrupted in circumference except for two openings 1012, 1014. The openings 1012, 1014 are used to receive a clip 1020. The clip 1020 may include a first extension 1022 and a second extension 1024 that have ends that are received in the respective openings 1012, 1014. When the ends of the extensions 1022, 1024 are inserted within the openings 1012, 1014, the intermediate members $250^v$ and $252^v$ are secured therein. That is, the ends of the extensions 1022, 1024 perform an interference fit with the base 910 of the intermediate member formed between the two portions $250^v$ and $252^v$.

Figure 11:
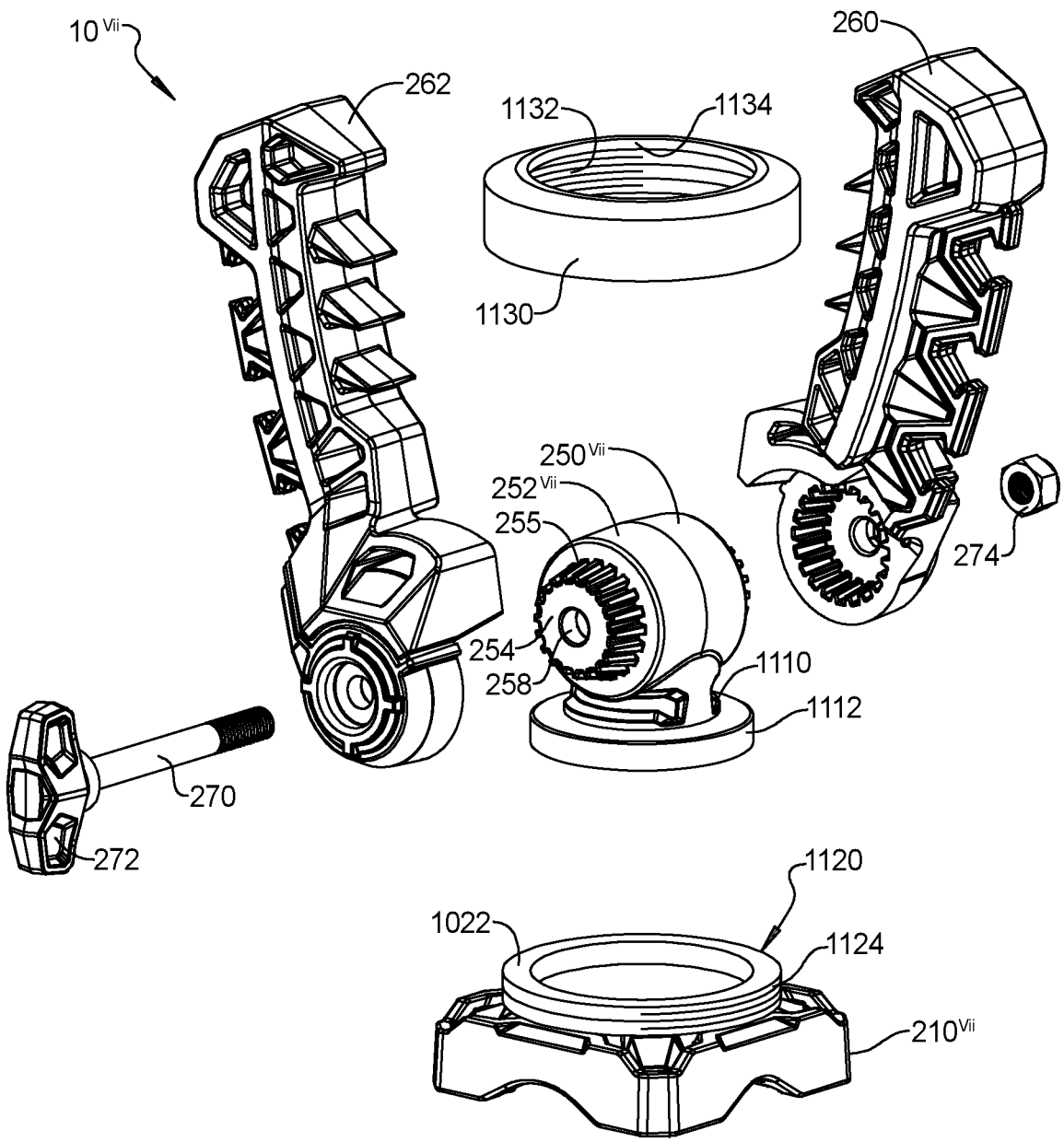
FIG. 11 is an exploded view of another example of a gripping device having a threaded retainer collar.

Referring now to FIG. 11, another example of a grip $10^{vii}$ is set forth. In this example, the intermediate member 1110 may be integrally formed from two portions $252^{vii}$ and $250^{vii}$. The intermediate member 1110 includes a flange 1112 that extends in a radial distance from the longitudinal axis of the intermediate member. The flange 1112 is sized to be received within a receiver 1120 formed by longitudinally extending walls 1122. The outside of the walls 1122 may include threads 1124. A top ring 1130 having internal threads 1132 that engage the threads 1124. During assembly, the intermediate member 1110 is placed directly adjacent to the base $210^{vii}$ so that the flange 1112 is within the walls 1122. The ring 1130 has an opening 1134 that has a diameter that is less than the diameter of the flange 1112. Therefore, the ring 1130 is used to retain the flange 1112 to the base $210^{vii}$.

Figure 12:
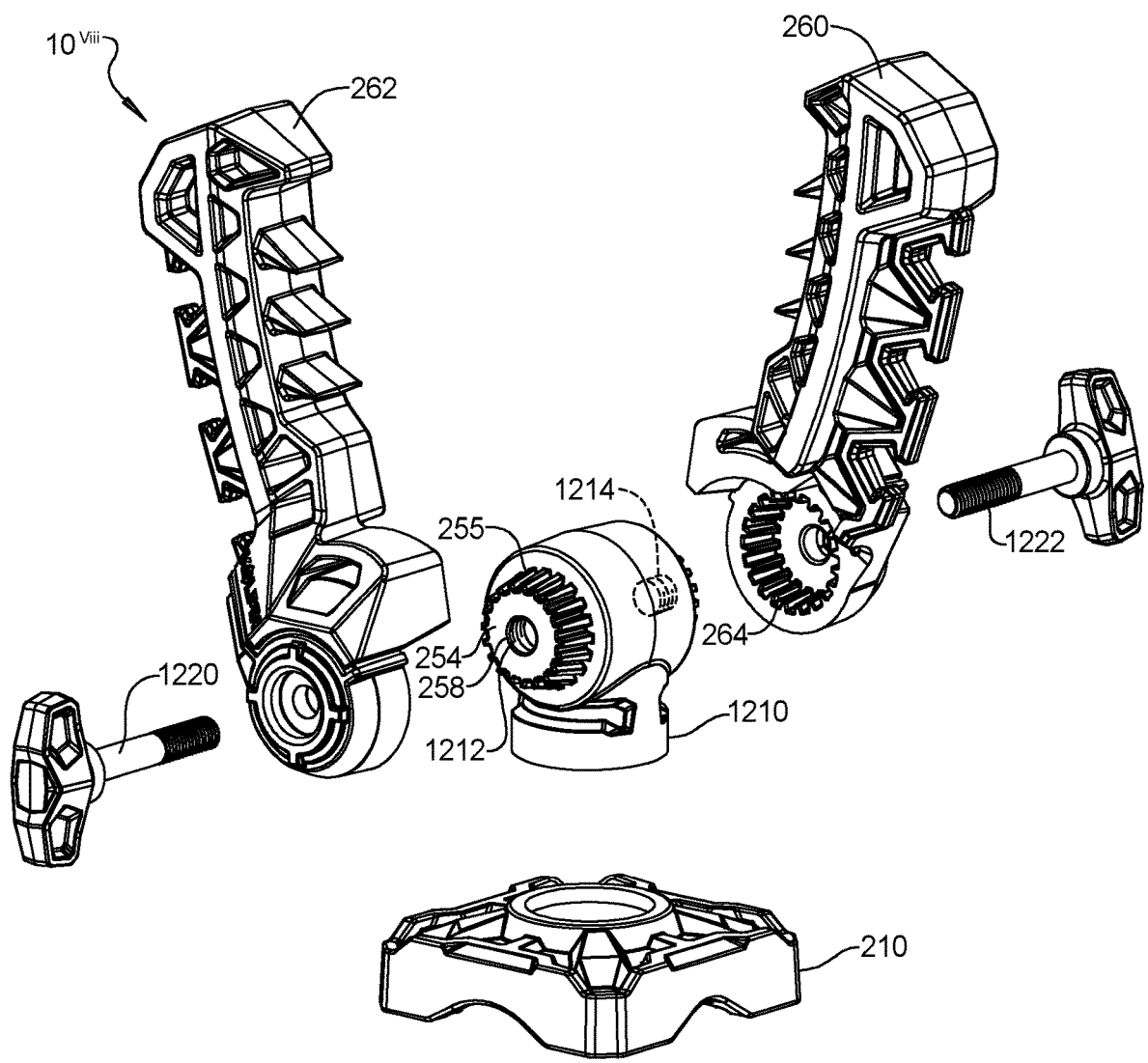
FIG. 12 is a perspective view of another example of a retaining device having two independently securable arms.

Referring now to FIG. 12, another example of a grip $10^{vii}$ is set forth. In this example, the intermediate member 1210 includes a first threaded portion 1212 and a second threaded portion 1214. The threaded portions 1212, 1214 are used to receive a threaded fastener 1220, 1222. In this manner, the arms 260 and 262 are independently removable or securable. That is, one of the arms 260, 262 may be removed or moved relative to the intermediate member 1210 without unsecuring the other arm. The threaded portions 1212, 1214 may be integrally formed within the intermediate member 1210 or may be overmolded nuts that receive the respective threads of the fasteners 1220, 1222. The intermediate member 1210 may be secured to the base using one of the methods as described above in FIGS. 7-11. Thus, the bottom portion of the intermediate member 1210 may be formed accordingly. Likewise, the base $210^{vii}$ may have a corresponding shape for receiving the intermediate member 1210.

Figure 13:
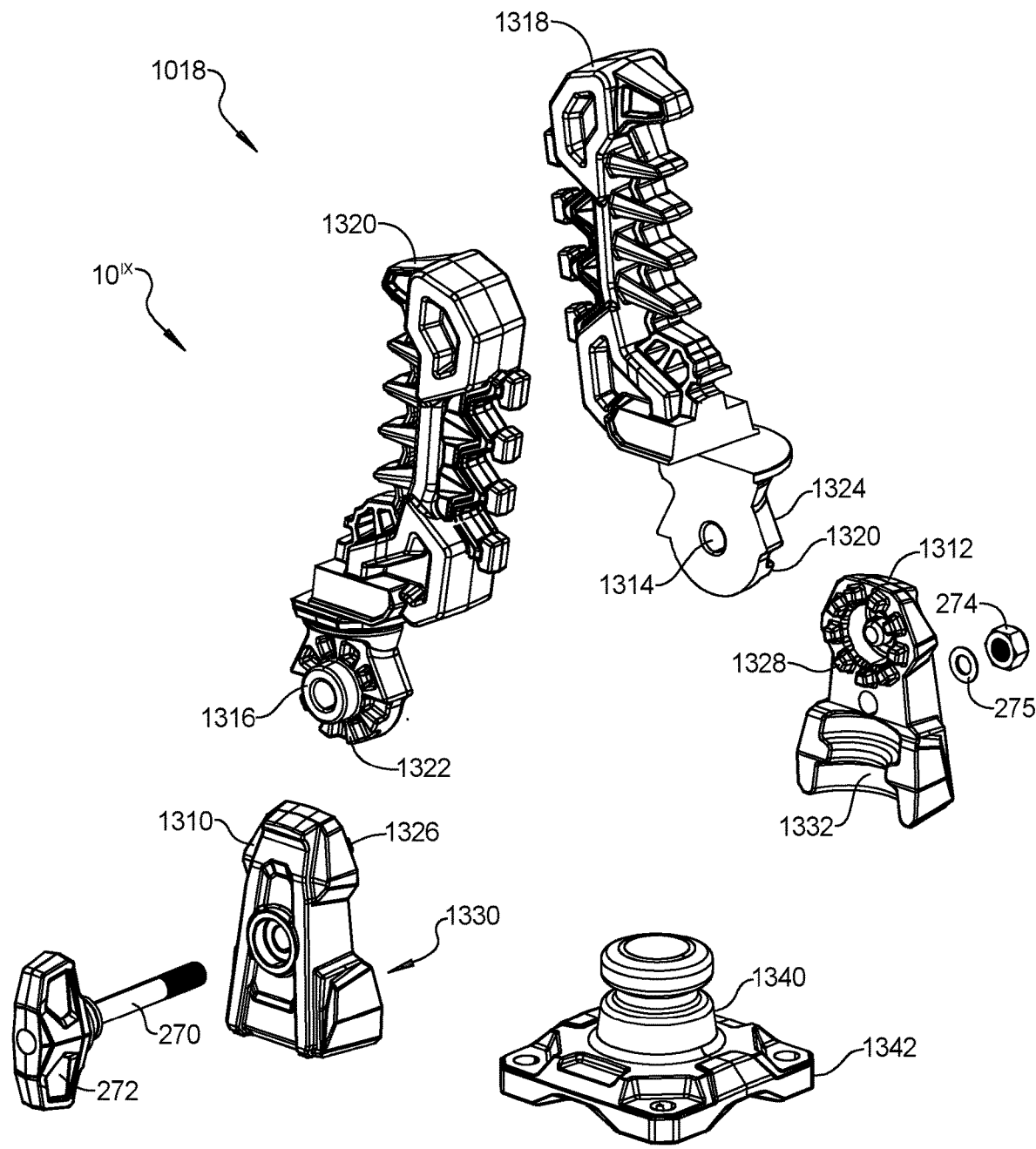
FIG. 13 is an exploded view of another example of a gripping device having arms internally connected to an intermediate device.

Referring now to FIG. 13, another example of a grip $10ix$ is set forth. In this example, intermediate members 1310, 1312 receive the end portions 1314, 1316 of arms 1318, 1320. The arms 1318, 1320 have toothed portions 1322, 1324 that engage toothed portions 1326 and 1328 on inside surfaces of the intermediate members 1310, 1312. The interior portion of the intermediate members 1310, 1312 may include receiving channels 1330, 1332 that receive the extension 1340 of the base 1342. The extension 1340 may have various shapes to allow various types or lack of movement. For example, in the example set forth in FIG. 13, the intermediate members 1310, 1312 may move in various positions. However, should teeth be used on the extension 1340, teeth may also be used within the channels 1330 and 1332 to engage or nest with the teeth in a similar manner to that set forth in FIG. 2. The grip $10^{ix}$ may be held together with fastener 270 and nut 274. A washer 275 may be used adjacent to the nut 274.

Figure 14:
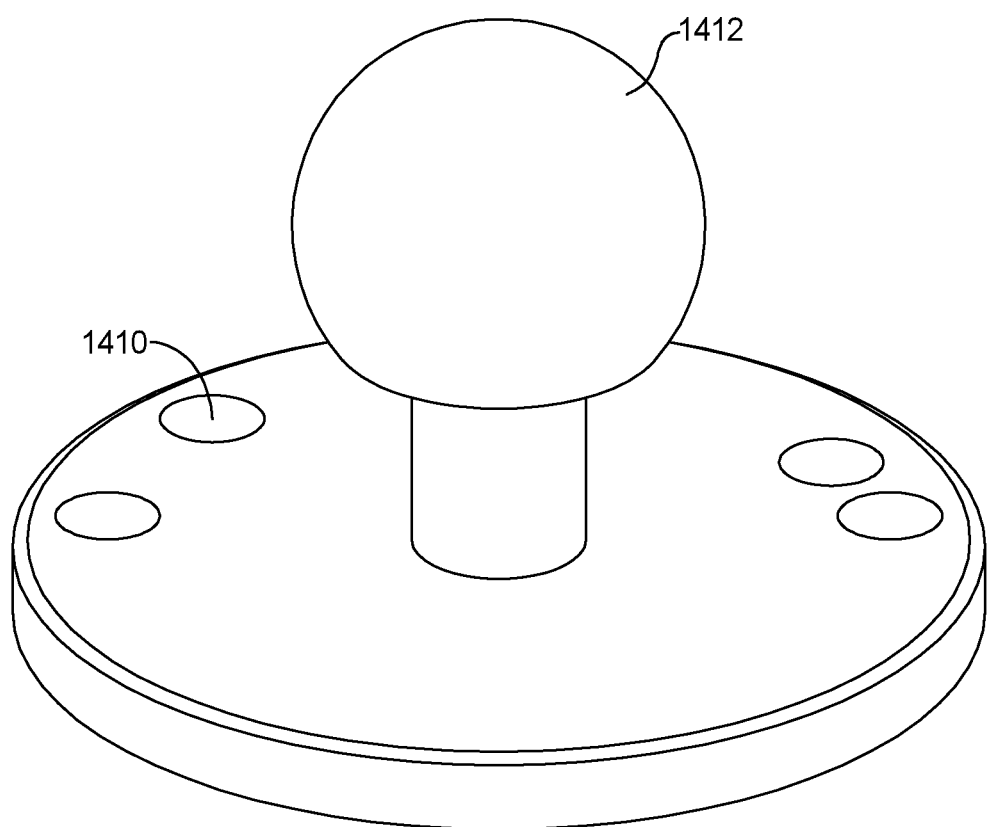
FIG. 14 is a perspective view of an alternative base.

Referring now to FIG. 14, a base 1410 having a ball 1412 may be used in the various examples set forth above. In this example, the inner channel 1330, 1332 set forth in FIG. 13 may be correspondingly shaped to receive the ball 1412 so that the intermediate members 1310, 1312 pivot relative to the base 1410.

Figure 15:
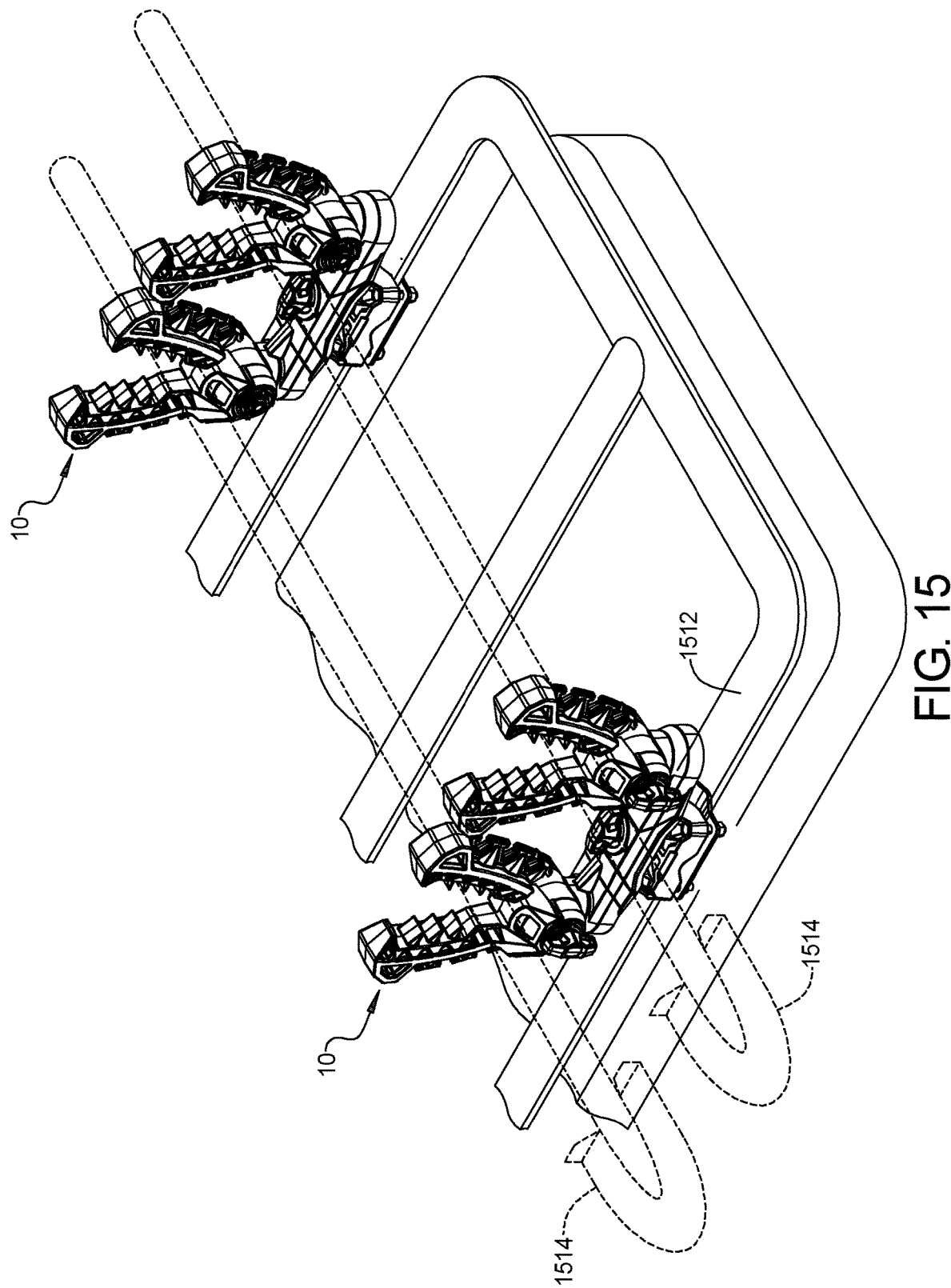
FIG. 15 is a perspective view of an alternative double gripping device in accordance with another aspect of the disclosure.

Referring now to FIG. 15, a grip 1510 is illustrated coupled to a portion of a vehicle 1512. As mentioned above, the grip 1510 may be used to hold an implement 1514. However, in this example, the grip 1510 is a double grip.

That is, the grip may have two sets of independently movable and positionable arms for securing an implement to the vehicle.

Figure 16:
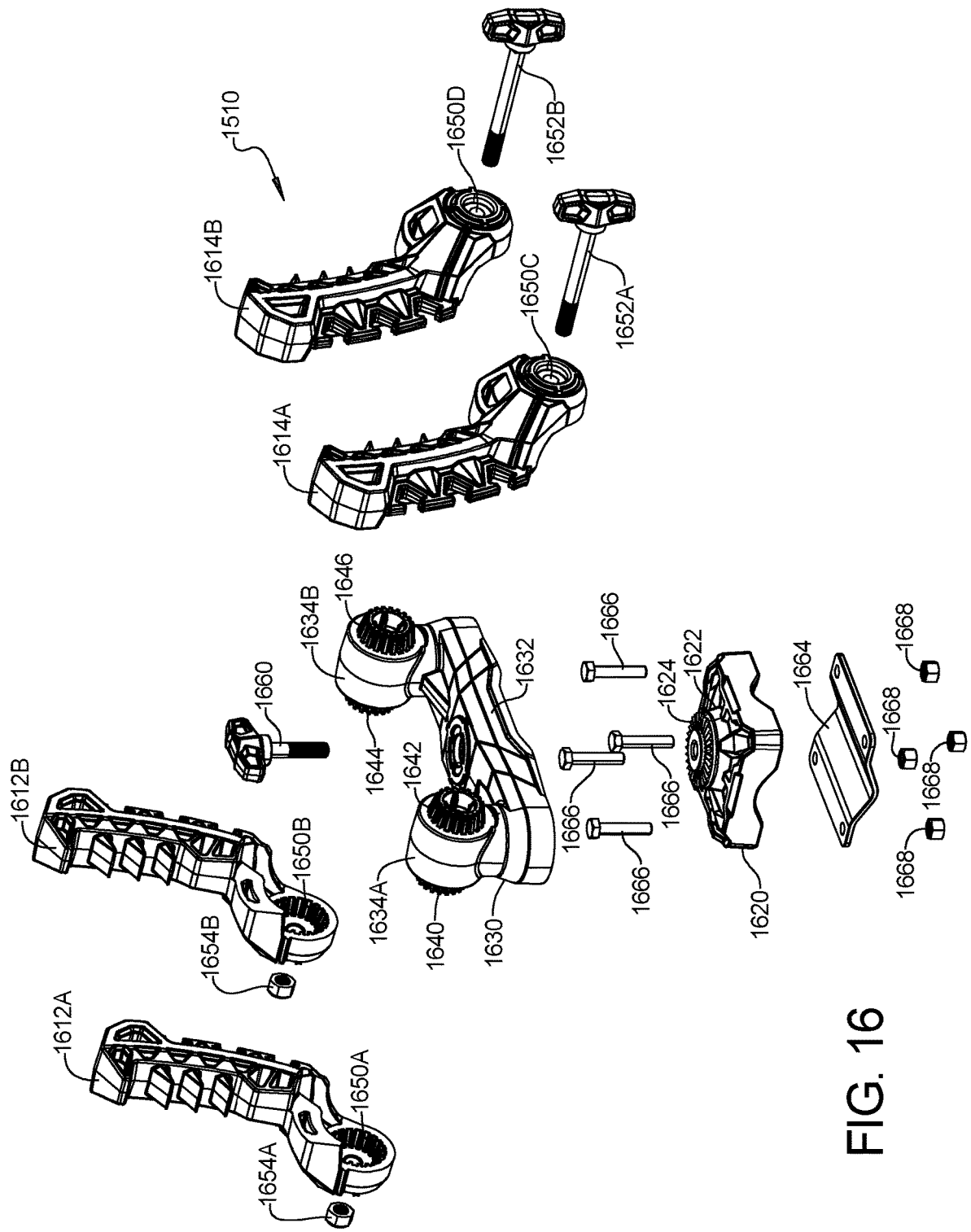
FIG. 16 is an exploded view of the double gripping device of FIG. 15.

Referring now to FIG. 16, the grip 1510 includes a first pair of arms 1612A and 1612B. The grip also includes a second pair of arms 1614A and 1614B. The arms may be formed in a similar manner to that set forth above. The grip 1510 includes a base 1620 that has an extension 1622 extending in a longitudinal direction. The extension 1622 may include teeth 1624. The teeth 1624 are used for engaging teeth (not shown) in an intermediate member 1630. That is, the underside of the intermediate member 1630 may include teeth used for receiving the teeth 1624. In this example, the intermediate member 1630 includes a cross beam 1632 that is coupled to a first mounting portion 1634A and 1634B. The mounting portion 1634A includes threaded portion 1640 and 1642 that may be conical in shape as described above. The second mounting portion 1634B may include toothed portions 1644 and 1646. Again, the toothed portions 1644, 1646 may be conical in shape. The conical shapes of the two portions 1644, 1646 may be used to receive the receiving portions 1650A, 1650B, 1650C and 1650D, respectively. A pair of fasteners 1652A and 1652B may be used to secure the arms 1612A, 1612B, 1614A and 1614B to the respective mounting portions 1634A, 1634B using nuts 1654A, 1654B. A fastener 1660 may be used to mount the cross beam 1632 to the base 1620. The cross beam 1632 may be positioned in various radial orientations.

The mounting portions 1634A, 1634B are fixed relative to the cross beam 1632. However, the cross beam 1632 may rotate relative to the base 1620 to be positioned in a desired position. The fastener 1660 is used to secure the cross beam 1632 to the base so that the teeth therein engage and thus the cross beam is fixed to the base 1620. A backer plate 1664 is used together with fasteners 1666 and nuts 1668 to secure the backer plate 1664 relative to the base 1620 and thus secure the entire grip to a portion of the vehicle.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A grip assembly comprising:
   a base member;
   a cross beam coupled to the base member comprising a first mounting portion and a second mounting portion;
   a first grip arm removably coupled to the first mounting portion and independently positionable into a first position of a first plurality of lockable positions relative to the first mounting portion;
   a second grip arm coupled to and independently positionable into a second position of a second plurality of lockable positions relative to the first grip arm;
   a third grip arm removably coupled to the second mounting portion and independently positionable into a third position of a third plurality of lockable positions relative to the second mounting portion; and
   a fourth grip arm coupled to and independently positionable into a fourth position of a fourth plurality of lockable positions relative to the third grip arm.

2. The grip assembly as recited in claim 1 wherein the cross beam is independently positionable into a fifth position of a fifth plurality of lockable positions relative to the base member, the cross beam being removably couplable to the base member.

3. The grip assembly of claim 1 wherein the first mounting portion comprises a first portion adjacent to the first grip arm and a second portion adjacent to the second grip arm.

4. The grip assembly of claim 3 wherein first grip arm comprises a first plurality of teeth and the second grip arm comprises a second plurality of teeth.

5. The grip assembly of claim 4 wherein the first portion comprises a third plurality of teeth and the second portion comprises a fourth plurality of teeth, said first plurality of teeth engaging the third plurality of teeth and the second plurality of teeth engaging the fourth plurality of teeth.

6. The grip assembly of claim 4 wherein the first portion comprises a third plurality of teeth and the second portion comprises a fourth plurality of teeth, said first plurality of teeth lockably engaging the third plurality of teeth and the second plurality of teeth lockably engaging the fourth plurality of teeth.

7. The grip assembly of claim 4 wherein the first portion comprises a third plurality of teeth and the second portion comprises a fourth plurality of teeth, said first plurality of teeth lockably engaging the third plurality of teeth and the second plurality of teeth lockably engaging the fourth plurality of teeth using a first fastener extending though the first grip arm, the second grip arm and the first mounting portion.

8. The grip assembly as recited in claim 7 wherein the first fastener comprises a first bolt which couples to a second nut fixedly mounted to the second grip arm.

9. The grip assembly of claim 7 wherein the first grip arm and the first portion and the second grip arm and the second portion are angularly positionable in multiple positions relative to the first mounting portion.

10. The grip assembly of claim 7 wherein the third plurality of teeth comprises a first conical cross section and wherein the fourth plurality of teeth comprises a first conical cross section.

11. The grip assembly of claim 7 wherein the second mounting portion comprises a third portion adjacent to the third grip arm and a fourth portion adjacent to the fourth grip arm.

12. The grip assembly of claim 11 wherein third grip arm comprises a fifth plurality of teeth and the fourth grip arm comprises a sixth plurality of teeth.

13. The grip assembly of claim 12 wherein the third portion comprises a seventh plurality of teeth and the fourth portion comprises a eighth plurality of teeth, said fifth plurality of teeth engaging the seventh plurality of teeth and the sixth plurality of teeth engaging the eight plurality of teeth.

14. The grip assembly of claim 12 wherein the third portion comprises a seventh plurality of teeth and the fourth portion comprises a eighth plurality of teeth, said fifth plurality of teeth lockably engaging the seventh plurality of teeth and the sixth plurality of teeth lockably engaging the eight plurality of teeth.

15. The grip assembly of claim 12 wherein the third portion comprises a seventh plurality of teeth and the fourth portion comprises a eighth plurality of teeth, said fifth plurality of teeth lockably engaging the seventh plurality of teeth and the sixth plurality of teeth lockably engaging the eight plurality of teeth using a second fastener extending though the third grip arm, the fourth grip arm and the second mounting portion.

16. The grip assembly as recited in claim 15 wherein the second fastener comprises a second bolt which couples to a second nut fixedly mounted to the third grip arm.

17. The grip assembly of claim 15 wherein the seventh plurality of teeth comprises a third conical cross section and wherein the eighth plurality of teeth comprises a fourth conical cross section.

18. The grip assembly as recited in claim 1 wherein the base member is coupled to the cross beam using a longitudinally extending bolt.

19. A method of positioning a grip assembly comprising:
independently positioning a cross beam relative to a base member in a first position of a first plurality of lockable positions;
removably coupling the cross beam to the base member;
removably coupling a first grip arm to the cross beam in a second position of a second plurality of lockable positions using a first fastener;
removably coupling a second grip arm in a third position of a third plurality of lockable positions relative to third grip arm using the first fastener;
removably coupling a third grip arm to the cross beam in a fourth position of a fourth plurality of lockable positions using a second fastener;
removably coupling a fourth grip arm in a fifth position of a fifth plurality of lockable positions relative to the third grip arm using the second fastener;
independently positioning the second grip arm relative to the first grip arm; and
independently positioning the fourth grip arm relative to the third grip arm.

20. The method of claim 19 wherein removably coupling the first grip arm to the cross beam comprises removably coupling the first grip arm to the cross beam at a first mounting portion and wherein removably coupling the second grip arm comprises removably coupling the second grip arm to the cross beam at the first mounting portion, and wherein removably coupling the third grip arm to the cross beam comprises removably coupling the third grip arm to the cross beam at a second mounting portion and wherein removably coupling the fourth grip arm comprises removably coupling the fourth grip arm to the cross beam at the second mounting portion.

* * * * *